US012812760B2

(12) United States Patent
Pan et al.

(10) Patent No.: US 12,812,760 B2
(45) **Date of Patent: *Nov. 24, 2026**

(54) ACCELERATING APPARATUS FOR A RADIATION DEVICE

(71) Applicant: SHANGHAI UNITED IMAGING HEALTHCARE CO., LTD., Shanghai (CN)

(72) Inventors: Gang Pan, Shanghai (CN); Shoubo He, Shanghai (CN); Ruiying Song, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 50 days.

This patent is subject to a terminal disclaimer.

(21) Appl. No.: 19/031,451

(22) Filed: Jan. 18, 2025

(65) Prior Publication Data

US 2025/0176094 A1 May 29, 2025

Related U.S. Application Data

(63) Continuation-in-part of application No. 17/456,882, filed on Nov. 29, 2021, now Pat. No. 12,225,656, which is a continuation-in-part of application No. 16/729,305, filed on Dec. 28, 2019, now Pat. No. 11,191,148.

(30) Foreign Application Priority Data

Dec. 28, 2018 (CN) ........................ 201811627649.0

(51) Int. Cl.
*H05H 7/22* (2006.01)

(52) U.S. Cl.
CPC ......... *H05H 7/22* (2013.01); *H05H 2007/225* (2013.01)

(58) Field of Classification Search
None
See application file for complete search history.

(56) References Cited

U.S. PATENT DOCUMENTS 4,024,426 A * 5/1977 Vaguine .................. H05H 9/04 315/505
4,093,854 A * 6/1978 Turcotte .................. G01V 5/12 250/269.2

(Continued)

*Primary Examiner* — Srinivas Sathiraju
(74) *Attorney, Agent, or Firm* — METIS IP LLC

(57) ABSTRACT

The present disclosure relates to an accelerating apparatus for a radiation device. The accelerating apparatus may include a plurality of acceleration cavity units including a plurality of acceleration cavities. Each of the plurality of acceleration cavity units may be configured to accelerate a radiation beam passing through an acceleration cavity. And the accelerating apparatus may further include a plurality of coupling cavity units each of which may include a coupling cavity. Two adjacent acceleration cavities may be electromagnetically coupled via the coupling cavity. The plurality of acceleration cavity units may have a plurality of holes each of which may be configured to be in fluidic communication with the corresponding coupling cavity. And an edge region of each of at least a portion of the plurality of holes may include continuously varying curvatures.

20 Claims, 10 Drawing Sheets

(56) References Cited

U.S. PATENT DOCUMENTS

| | | | | | |
|---|---|---|---|---|---|
| 4,382,208 | A * | 5/1983 | Meddaugh | H05H 7/18 | 315/5.46 |
| 4,425,529 | A * | 1/1984 | Leboutet | H05H 9/00 | 315/5.41 |
| 4,629,938 | A * | 12/1986 | Whitham | H05H 9/04 | 315/5.41 |
| 4,975,652 | A * | 12/1990 | Tronc | H05H 9/00 | 315/505 |
| 5,523,659 | A * | 6/1996 | Swenson | H05H 9/00 | 315/506 |
| 6,376,990 | B1 * | 4/2002 | Allen | H05H 7/18 | 315/505 |
| 6,407,505 | B1 * | 6/2002 | Bertsche | H05H 9/04 | 315/5.46 |
| 6,642,678 | B1 * | 11/2003 | Allen | H05H 7/18 | 315/505 |
| 6,646,383 | B2 * | 11/2003 | Bertsche | H05H 7/22 | 315/505 |
| 6,777,893 | B1 * | 8/2004 | Swenson | H05H 9/00 | 315/505 |
| 7,005,809 | B2 * | 2/2006 | Whitham | H05H 7/00 | 315/506 |
| 7,112,924 | B2 * | 9/2006 | Hanna | H05H 7/18 | 315/5.41 |
| 7,239,095 | B2 * | 7/2007 | Ho | H05H 7/18 | 315/505 |
| 7,400,093 | B2 * | 7/2008 | Salop | H01J 35/00 | 315/501 |
| 7,423,381 | B2 * | 9/2008 | Hanna | H05H 7/18 | 315/505 |
| 7,898,193 | B2 * | 3/2011 | Miller | H05H 7/22 | 315/505 |
| 8,203,289 | B2 * | 6/2012 | Ho | H05H 9/04 | 315/505 |
| 8,232,749 | B1 * | 7/2012 | Barov | H05H 7/18 | 315/505 |
| 8,284,898 | B2 * | 10/2012 | Ho | H05H 9/04 | 378/65 |
| 8,610,380 | B2 * | 12/2013 | Vaccaro | H05H 9/00 | 315/501 |
| 8,983,017 | B2 * | 3/2015 | McIntyre | G21G 1/08 | 376/195 |
| 9,031,200 | B2 * | 5/2015 | Ho | H05H 9/04 | 378/65 |
| 9,398,681 | B2 * | 7/2016 | Tantawi | H05H 7/18 | |
| 9,485,849 | B1 * | 11/2016 | Vetter | H05H 7/04 | |
| 9,655,227 | B2 * | 5/2017 | Wang | H05H 7/18 | |
| 10,485,088 | B1 * | 11/2019 | Hassan | H05H 7/20 | |
| 10,932,354 | B2 * | 2/2021 | Agustsson | H05H 9/00 | |
| 11,191,148 | B2 * | 11/2021 | He | H05H 7/22 | |
| 11,483,920 | B2 * | 10/2022 | Hannon | H05H 7/02 | |
| 11,540,382 | B2 * | 12/2022 | Kutsaev | H05H 7/001 | |
| 11,612,049 | B2 * | 3/2023 | Agustsson | H05H 7/18 | |
| 11,800,631 | B2 * | 10/2023 | Agustsson | H05H 9/02 | |
| 12,225,656 | B2 * | 2/2025 | He | H05H 7/22 | |
| 2004/0212331 | A1 * | 10/2004 | Swenson | H05H 7/22 | 315/506 |
| 2004/0213375 | A1 * | 10/2004 | Bjorkholm | H01J 35/24 | 378/58 |
| 2005/0212465 | A1 * | 9/2005 | Zavadtsev | H05H 7/22 | 315/500 |
| 2006/0011825 | A1 * | 1/2006 | Pirozhenko | H05H 9/04 | 250/251 |
| 2007/0025505 | A1 * | 2/2007 | Bjorkholm | G01V 5/224 | 378/53 |
| 2007/0120508 | A1 * | 5/2007 | Hanna | H05H 9/04 | 315/505 |
| 2007/0274445 | A1 * | 11/2007 | Zavadtsev | G01N 23/04 | 378/57 |
| 2008/0068112 | A1 * | 3/2008 | Yu | H01P 1/2005 | 333/228 |
| 2009/0045746 | A1 * | 2/2009 | Hanna | H05H 7/18 | 315/5.41 |
| 2013/0051508 | A1 * | 2/2013 | Mcintyre | H05H 7/04 | 376/310 |
| 2013/0328506 | A1 * | 12/2013 | Yamamoto | H05H 7/22 | 315/505 |
| 2014/0002196 | A1 * | 1/2014 | Leek | H03L 7/00 | 331/6 |
| 2014/0191654 | A1 * | 7/2014 | Tantawi | H05H 7/02 | 315/5.41 |
| 2014/0299782 | A1 * | 10/2014 | Seryi | H05H 9/00 | 315/505 |
| 2015/0366046 | A1 * | 12/2015 | Wang | H05H 7/18 | 315/504 |
| 2018/0277276 | A1 * | 9/2018 | Purwar | G21K 5/04 | |
| 2020/0137869 | A1 * | 4/2020 | Vassal | H05H 7/22 | |
| 2020/0214119 | A1 * | 7/2020 | He | H05H 9/044 | |
| 2020/0227184 | A1 * | 7/2020 | Purwar | A61N 5/1043 | |
| 2021/0274633 | A1 * | 9/2021 | Hannon | H05H 7/02 | |
| 2022/0087005 | A1 * | 3/2022 | He | H05H 7/22 | |
| 2022/0201833 | A1 * | 6/2022 | Bourne | H05H 9/042 | |
| 2023/0103140 | A1 * | 3/2023 | Zhang | H05H 9/00 | 250/310 |
| 2025/0176094 | A1 * | 5/2025 | Pan | H05H 7/22 | |

* cited by examiner

ACCELERATING APPARATUS FOR A RADIATION DEVICE

CROSS-REFERENCE TO RELATED APPLICATIONS

This application is a partial Continuation of U.S. application Ser. No. 17/456,882, filed on Nov. 29, 2021, which is a partial Continuation of U.S. application Ser. No. 16/729,305, filed on Dec. 28, 2019, now U.S. Pat. No. 11,191,148, which claims priority to Chinese Patent Application No. 201811627649.0, filed on Dec. 28, 2018, the contents of each of which are hereby incorporated by reference.

TECHNICAL FIELD

The present application generally relates to a mechanical device, and more particularly, to an accelerating apparatus and a radiation device including the accelerating apparatus.

BACKGROUND

Radiation devices have been widely used in various scenarios including, for example, radiation therapy, imaging diagnosis, or the like. An accelerating apparatus, such as a standing wave acceleration tube, is a widely used component in a radiation device, which is mainly used to propel particles to very high speeds and energies using electric fields. The accelerating apparatus can further generate radiation beams of different energies by using an energy-conditioning component, such that the radiation device can work in different modes (e.g., a homo-source dual-beam mode).

Conventionally, when an accelerating apparatus in a radiation device is fed with high microwave power, the surface of a coupling channel between an acceleration cavity and a coupling cavity of the accelerating apparatus may have a large current density distributed thereon. Correspondingly, an electric field strength near the surface of the coupling channel may be large, which may increase a breakdown rate in the accelerating apparatus, thereby reducing stability and reliability of the accelerating apparatus. Therefore, it is desirable to provide an accelerating apparatus with improved stability and reliability.

SUMMARY

An aspect of the present disclosure relates to an accelerating apparatus. The accelerating apparatus may include a plurality of acceleration cavity units including a plurality of acceleration cavities. Each of the plurality of acceleration cavity units may be configured to accelerate a radiation beam passing through an acceleration cavity. And the accelerating apparatus may further include a plurality of coupling cavity units each of which may include a coupling cavity. Two adjacent acceleration cavities may be electromagnetically coupled via the coupling cavity. The plurality of acceleration cavity units may have a plurality of holes each of which may be configured to be in fluidic communication with the corresponding coupling cavity. And an edge region of each of at least a portion of the plurality of holes may include continuously varying curvatures.

In some embodiments, the plurality of acceleration cavity units may be arranged in sequence along a moving direction of the radiation beam.

In some embodiments, the edge region of each of at least a portion of the plurality of holes may be configured with a filleted corner such that the edge region of the each of at least a portion of the plurality of holes may include the continuously varying curvatures.

In some embodiments, the edge region of each of at least a portion of the plurality of holes may include a first intersection region between an inner wall of the each of at least a portion of the plurality of holes and an inner wall of the acceleration cavity, a second intersection region between the inner wall of the each of at least a portion of the plurality of holes and an outer wall of each of at least a portion of the plurality of acceleration cavity units, or the like, or any combination thereof.

In some embodiments, the outer wall of each of at least a portion of the plurality of acceleration cavity units may have a groove corresponding to the each of at least a portion of the plurality of holes. And one of the plurality of coupling cavity units may be coupled with a surface of the groove.

In some embodiments, the surface of the groove may include a first plane corresponding to the each of at least a portion of the plurality of holes, the one of the plurality of coupling cavity units may include a second plane, and the first plane may be physically connected with the second plane.

In some embodiments, the accelerating apparatus may further include one or more energy-conditioning components each of which may be configured to adjust an electric field strength of the acceleration cavity corresponding to the energy-conditioning component.

In some embodiments, at least one of the one or more energy-conditioning components may include a resonant element and the resonant element may be moveable in the coupling cavity to open or close the each of at least a portion of the plurality of holes.

In some embodiments, the resonant element may be moveable in a direction perpendicular to the first plane.

In some embodiments, when the resonant element moves in the direction perpendicular to the first plane, the resonant element may be capable of contacting the first plane.

In some embodiments, the resonant element may be moveable between the first plane and the second plane in a direction parallel to the first plane to close or open the each of at least a portion of the plurality of holes.

In some embodiments, a maximum moving distance of the resonant element may be greater than or equal to a length of the each of at least a portion of the plurality of holes in a moving direction of the resonant element.

In some embodiments, when the each of at least a portion of the plurality of holes is entirely covered by the resonant element to close the each of at least a portion of the plurality of holes, an electric field strength of the acceleration cavity corresponding to the each of at least a portion of the plurality of holes may be zero.

In some embodiments, the first plane may be parallel to a long axis of the accelerating apparatus. And the second plane may be parallel to a long axis of the one of the plurality of coupling cavity units.

In some embodiments, the each of at least a portion of the plurality of holes may be a waist-shaped hole or an oval hole.

In some embodiments, an angle between a central axis of the each of at least a portion of the plurality of holes and a central axis of one of the plurality of acceleration cavity units that the each of at least a portion of the plurality of holes may be located in a range from 0 degrees to 90 degrees.

Another aspect of the present disclosure relates to an accelerating apparatus. The accelerating apparatus may include a plurality of acceleration cavity units including a plurality of acceleration cavities. Each of the plurality of acceleration cavity units may be configured to accelerate a radiation beam passing through an acceleration cavity. And the accelerating apparatus may further include a plurality of coupling cavity units each of which may include a coupling cavity. Two adjacent acceleration cavities may be electromagnetically coupled via the coupling cavity. The plurality of acceleration cavity units may have a plurality of holes each of which may be configured to be in fluidic communication with the corresponding coupling cavity. And an edge region of each of at least a portion of the plurality of holes may be configured with a chamfer.

In some embodiments, an outer wall of each of at least a portion of the plurality of acceleration cavity units may have a groove corresponding to the each of at least a portion of the plurality of holes. And one of the plurality of coupling cavity units may be coupled with a surface of the groove. The surface of the groove may include a first plane corresponding to the each of at least a portion of the plurality of holes, the one of the plurality of coupling cavity units may include a second plane, and the first plane may be physically connected with the second plane.

In some embodiments, the accelerating apparatus may further include one or more energy-conditioning components each of which may be configured to adjust an electric field strength of the acceleration cavity corresponding to the energy-conditioning component.

A further aspect of the present disclosure relates to a radiation device including an accelerating apparatus and a radiation source configured to generate a radiation beam. The accelerating apparatus may include a radiation source configured to generate a radiation beam. The accelerating apparatus may further include a plurality of acceleration cavity units including a plurality of acceleration cavities. Each of the plurality of acceleration cavity units may be configured to accelerate a radiation beam passing through an acceleration cavity. And the accelerating apparatus may also include a plurality of coupling cavity units each of which may include a coupling cavity. Two adjacent acceleration cavities may be electromagnetically coupled via the coupling cavity. The plurality of acceleration cavity units may have a plurality of holes each of which may be configured to be in fluidic communication with the corresponding coupling cavity. And an edge region of each of at least a portion of the plurality of holes may include continuously varying curvatures.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
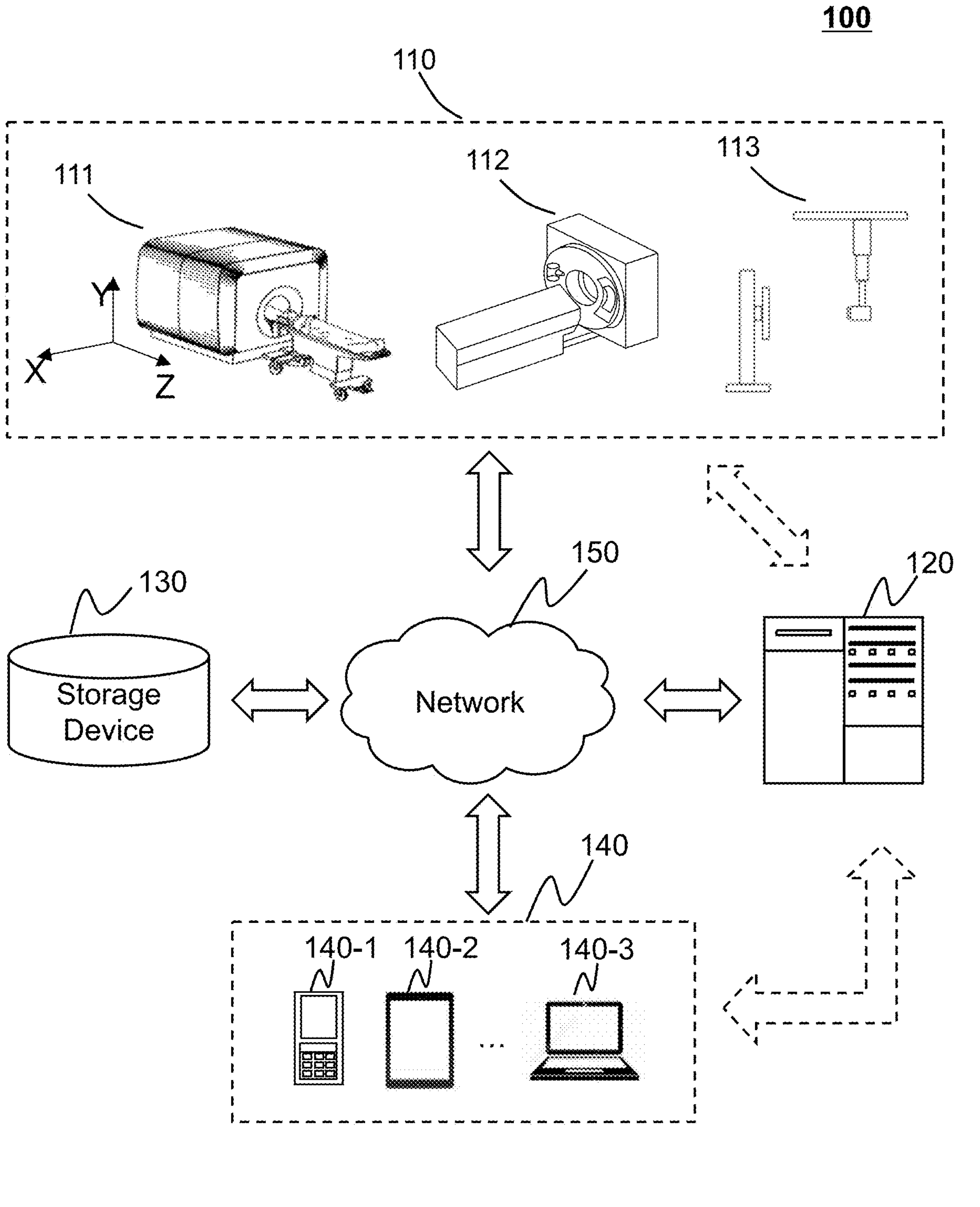
FIG. 1 is a schematic diagram illustrating an exemplary radiation system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Spatial and functional relationships between elements are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. In addition, a spatial and functional relationship between elements may be achieved in various ways. For example, a mechanical connection between two elements may include a welded connection, a key connection, a pin connection, an interference fit connection, or the like, or any combination thereof. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to an accelerating apparatus. The accelerating apparatus may include a plurality of acceleration cavity units including a plurality of acceleration cavities. Each of the plurality of acceleration cavity units may be configured to accelerate a radiation beam passing through an acceleration cavity. The accelerating apparatus may further include a plurality of coupling cavity units each of which includes a coupling cavity. Two adjacent acceleration cavities may be electromagnetically coupled via the coupling cavity. The plurality of acceleration cavity units may have a plurality of holes each of which may be configured to be in fluidic communication with the corresponding coupling cavity. And an edge region of each of at least a portion of the plurality of holes may include continuously varying curvatures and/or may be configured with a chamfer.

According to the accelerating apparatus provided in the present disclosure, a plurality of acceleration cavities may be in fluidic communication with a corresponding coupling cavity via a plurality of holes, which may avoid a direct intersection between an acceleration cavity unit and a coupling cavity unit, thus avoiding cutting edges (e.g., a tip structure) with high current densities included in an intersection region between the acceleration cavity unit and the coupling cavity unit. In addition, an edge region of each of at least a portion of the plurality of holes may include continuously varying curvatures and/or may be configured with a chamfer, which may further avoid cutting edges included in the edge region. As a result, a breakdown rate of the accelerating apparatus may be reduced, such that stability and reliability of the accelerating apparatus may be improved. Furthermore, an outer wall of each of at least a portion of the plurality of acceleration cavity units may include a first plane and a corresponding coupling cavity unit may include a second plane. The each of at least a portion of the plurality of acceleration cavity units may be precisely coupled with the corresponding acceleration cavity unit via the first plane and the second plane, which may improve machining efficiency and a machining accuracy of the accelerating apparatus.

FIG. 1 is a schematic diagram illustrating an exemplary radiation system according to some embodiments of the present disclosure. As shown in FIG. 1, the radiation system 100 may include a radiation device 110, a processing device 120, a storage device 130, one or more terminals 140, and a network 150. The components in the radiation system 100 may be connected in one or more of various ways. Merely by way of example, as illustrated in FIG. 1, the radiation device 110 may be connected to the processing device 120 through the network 150. As another example, the radiation device 110 may be connected to the processing device 120 directly as indicated by the bi-directional arrow in dotted lines linking the radiation device 110 and the processing device 120. As a further example, the storage device 130 may be connected to the processing device 120 directly or through the network 150. As still a further example, one or more terminals 140 may be connected to the processing device 120 directly (as indicated by the bi-directional arrow in dotted lines linking the terminal 140 and the processing device 120) or through the network 150.

The radiation device 110 may be used in a medical system for medical imaging and/or medical treatment. In some embodiments, the medical system may include an imaging system. The imaging system may include a single modality imaging system and/or a multi-modality imaging system. The single modality imaging system may include, for example, a computed tomography (CT) imaging system, an X-ray imaging system, a molecular imaging (MI) system, a radiation therapy (RT) system, or the like, or any combination thereof. The multi-modality imaging system may include, for example, a computed tomography-magnetic resonance imaging (MRI-CT) system, a computed tomography-positron emission tomography (CT-PET) system, or the like, or any combination thereof. In some embodiments, the radiation device 110 may be used as a scanner configured to generate or provide image data via scanning a subject or a part of the subject in the imaging system. For example, the radiation device 110 may be used as a CT scanner (e.g., cone beam computed tomography (CBCT) scanner), a digital radiology (DR) scanner, an RT scanner, etc. In some embodiments, the medical system may include a radiotherapy system. The radiotherapy system may include a treatment plan system (TPS), an image-guided radiotherapy (IGRT) system, etc. The radiation device 110 used in the radiotherapy system may include a treatment device (e.g., a linear accelerator, a cyclotron, a synchrotron) configured to perform a radiotherapy on a subject and/or an imaging device (e.g., a CT scanner, a digital radiology (DR) scanner, etc.) configured to perform a scanning on a subject or a part of the subject.

In some embodiments, the radiation device 110 may include a radiation source, an accelerating apparatus (not shown), etc. The radiation source may be configured to generate radiation particles (e.g., αrays, βrays, γrays, X rays, etc.). The accelerating apparatus may include a plurality of acceleration cavity units including a plurality of acceleration cavities. When the radiation particles pass through the plurality of acceleration cavities, the radiation particles may be accelerated under an electric field generated in the accelerating apparatus. In some embodiments, the accelerating apparatus may accelerate radiation particles using electric fields with different intensities so as to generate radiation beams with different energies. For example, the radiation device 110 may work in a homo-source dual-beam mode in which a radiation beam with a high energy and a radiation beam with a low energy may be generated separately. The accelerated radiation beam with the relatively high energy may be used for medical therapy. In some embodiments, the radiation beam with the low energy may be used for medical imaging. The radiation beam with the high energy may be used for medical treatment. In this case, the radiation device 110 may be used for both medical imaging and medical treatment. In some embodiments, the radiation beam with the low energy and the radiation beam with the high energy may be both used for medical imaging (e.g., multi-energy imaging). More descriptions of the accelerating apparatus may be found elsewhere in the present disclosure (e.g., FIGS. 2-4B and the description thereof).

The processing device 120 may process data and/or information obtained from the radiation device 110, the storage device 130, and/or the terminal(s) 140. For example, the processing device 120 may reconstruct an image based on projection data (or measurement data) collected or generated by the radiation device 110. As another example, the processing device 120 may transmit an instruction to cause the radiation device 110 to perform a medical treatment (e.g., a radiotherapy). In some embodiments, the processing device 120 may be a single server or a server group. The server group may be centralized or distributed. In some embodiments, the processing device 120 may be local or remote. For example, the processing device 120 may access information and/or data from the radiation device 110, the storage device 130, and/or the terminal(s) 140 via the network 150. As another example, the processing device 120 may be directly connected to the radiation device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof.

The storage device 130 may store data, instructions, and/or any other information. In some embodiments, the storage device 130 may store data obtained from the processing device 120, the terminal(s) 140, and/or the radiation device 110. In some embodiments, the storage device 130 may store data and/or instructions that the processing device 120 may execute or use to perform operations such as a medical imaging, a medical therapy, etc. In some embodiments, the storage device 130 may include a mass storage, removable storage, a volatile read-and-write memory, a read-only memory (ROM), or the like, or a combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform as described elsewhere in the disclosure.

In some embodiments, the storage device 130 may be connected to the network 150 to communicate with one or more other components in the radiation system 100 (e.g., the processing device 120, the terminal(s) 140, etc.). One or more components of the radiation system 100 may access the data or instructions stored in the storage device 130 via the network 150. In some embodiments, the storage device 130 may be part of the processing device 120.

The terminal(s) 140 may be connected to and/or communicate with the radiation device 110, the processing device 120, and/or the storage device 130. For example, the terminal(s) 140 may obtain a reconstructed image from the processing device 120. As another example, the terminal(s) 140 may obtain image data acquired via the radiation device 110 and transmit the image data to the processing device 120 to be processed. In some embodiments, the terminal(s) 140 may include a mobile device 140-1, a tablet computer 140-2, a laptop computer 140-3, or the like, or a combination thereof. For example, the mobile device 140-1 may include a mobile phone, a personal digital assistant (PDA), a gaming device, a navigation device, a point of sale (POS) device, a laptop, a tablet computer, a desktop, or the like, or a combination thereof. In some embodiments, the terminal(s) 140 may include an input device, an output device, etc. The input device may include alphanumeric and other keys that may be input via a keyboard, a touchscreen (e.g., with haptics or tactile feedback), a speech input, an eye tracking input, a brain monitoring system, or any other comparable input mechanism. The input information received through the input device may be transmitted to the processing device 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing device 120.

The network 150 may include any suitable network that can facilitate the exchange of information and/or data for the radiation system 100. In some embodiments, one or more components of the radiation system 100 (e.g., the radiation device 110, the processing device 120, the storage device 130, the terminal(s) 140, etc.) may communicate information and/or data with one or more other components of the radiation system 100 via the network 150. For example, the processing device 120 may obtain image data from the radiation device 110 via the network 150. As another example, the processing device 120 may obtain user instruction(s) from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, switches, server computers, and/or a combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 150 may include one or more network access points. For example, the network 150 may include wired and/or wireless network access points such as base stations and/or internet exchange points through which one or more components of the radiation system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage device 130 may be a data storage including cloud computing platforms, such as public cloud, private cloud, community, and hybrid clouds, etc. However, those variations and modifications do not depart the scope of the present disclosure.

Figure 2:
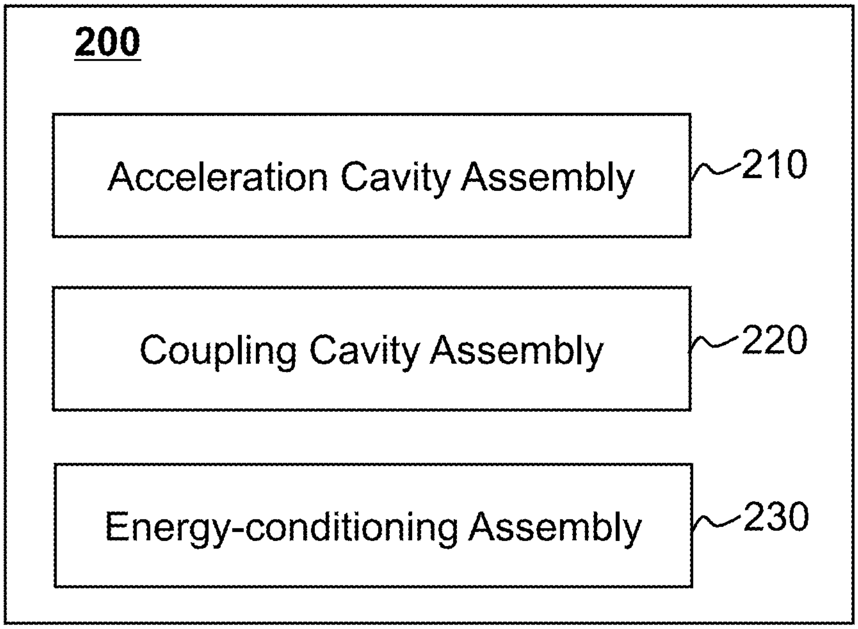
FIG. 2 is a schematic diagram illustrating components of an exemplary accelerating apparatus according to some embodiments of the present disclosure.

FIG. 2 is a schematic diagram illustrating components of an exemplary accelerating apparatus according to some embodiments of the present disclosure. The accelerating apparatus 200 may be used in a radiation device and configured to accelerate radiation particles fed by a radiation source of the radiation device (e.g., the radiation device 110). As used herein, "accelerating apparatus" may also be referred to as "accelerating tube". As illustrated in FIG. 2, the accelerating apparatus 200 may include an acceleration cavity assembly 210, a coupling cavity assembly 220, and an energy adjustment assembly 230.

The acceleration cavity assembly 210 may be configured to accelerate radiation particles. In some embodiments, the acceleration cavity assembly 210 may be configured to decelerate the radiation beam. The acceleration cavity assembly 210 may include a main body configured with a plurality of acceleration cavities. The main body may be configured to provide support for one or more components (e.g., the coupling cavity assembly 220, the energy-conditioning component 230) of the accelerating apparatus 200. The plurality of acceleration cavities may be in fluidic communication. The radiation particles may flow in the plurality of acceleration cavities and pass through the plurality of acceleration cavities. Alternatively or additionally, the radiation source may also be an external device coupled with the acceleration cavity assembly 210 and configured to generate the radiation particles. In some embodiments, the acceleration cavity assembly 210 may accelerate the radiation particles using an electric field. For example, the acceleration cavity assembly 210 may be coupled with a power source (e.g., a microwave power source) which is configured to feed microwave power to the acceleration cavity assembly 210. Correspondingly, the electric field may be generated in the acceleration cavity assembly 210. When the radiation particles pass through the plurality of acceleration cavities included in the acceleration cavity assembly 210, the radiation particles may be accelerated by the electric field to increase the energy of the radiation particles. More descriptions regarding the acceleration cavity assembly 210 may be found elsewhere in the present disclosure (e.g., FIGS. 3A-5 and the descriptions thereof).

The coupling cavity assembly 220 may be configured to electromagnetically couple the plurality of acceleration cavities included in the acceleration cavity assembly 210 such that a microwave power transmission in the plurality of acceleration cavities may be realized. The coupling cavity assembly 220 may include a plurality of secondary bodies configured with a plurality of coupling cavities. Each of the plurality of coupling cavities may be configured as a coupling cavity unit. Two adjacent acceleration cavities included in the acceleration cavity assembly 210 may be electromagnetically coupled via the coupling cavity. In some embodiments, the plurality of coupling cavities may be located at one single side of the acceleration cavity assembly 210. In some embodiments, the plurality of coupling cavities may be mounted at two sides of the acceleration cavity assembly 210 along a long axis of the accelerating apparatus 200, i.e., a moving direction of the radiation particles. For example, a first coupling cavity of the coupling cavity assembly 220 may be located at a first side of the acceleration cavity assembly 210. A second coupling cavity of the coupling cavity assembly 220 next to the first coupling cavity may be located at a second side of the acceleration cavity assembly 210. The second side may be opposite to the first side. A third coupling cavity of the coupling cavity assembly 220 next to the second coupling cavity may be located at the first side or the second side of the acceleration cavity assembly 210.

The acceleration cavity assembly 210 may also include a plurality of holes. As used herein, "hole" may also be referred to as "coupling channel." Each of at least a portion of the plurality of acceleration cavities may correspond to one or more holes. Each of two adjacent acceleration cavities and a coupling cavity may be in fluidic communication via a hole, such that the two adjacent acceleration cavities included in the acceleration cavity assembly 210 may be electromagnetically coupled via the coupling cavity. For example, the acceleration cavity assembly 210 may include a first acceleration cavity, a second acceleration cavity, and a third acceleration cavity. The first acceleration cavity may be adjacent to the second acceleration cavity and the second acceleration cavity may be adjacent to the third acceleration cavity. The acceleration cavity assembly 210 may include a first hole corresponding to the first acceleration cavity and a second hole corresponding to the second acceleration cavity. The first acceleration cavity and the second acceleration cavity may be in fluidic communication with a first coupling cavity of the coupling cavity assembly 220 via the first hole and the second hole, respectively. The first acceleration cavity and the second acceleration cavity may be electromagnetically coupled via the first coupling cavity. The acceleration cavity assembly 210 may further include a third hole corresponding to the second acceleration cavity and a fourth hole corresponding to the third acceleration cavity. The second acceleration cavity and the third acceleration cavity may be in fluidic communication with a second coupling cavity of the coupling cavity assembly 220 via the third hole and the fourth hole, respectively. The second acceleration cavity and the third acceleration cavity may be electromagnetically coupled via the second coupling cavity. In some embodiments, the first acceleration cavity and the second acceleration cavity may be configured as an acceleration cavity unit. The second acceleration cavity and the third acceleration cavity may be configured as an acceleration cavity unit.

As another example, the acceleration cavity assembly 210 may include a first acceleration cavity, a second acceleration cavity, a third acceleration cavity, and a fourth acceleration cavity. The first acceleration cavity, the second acceleration cavity, the third acceleration cavity, and the fourth acceleration cavity may be arranged in sequence along a moving direction of the radiation particles. In other words, the first acceleration cavity may be adjacent to the second acceleration cavity, the second acceleration cavity may be adjacent to the third acceleration cavity, and the third acceleration cavity may be adjacent to the fourth acceleration cavity. The acceleration cavity assembly 210 may include a first hole corresponding to the first acceleration cavity, a second hole corresponding to the second acceleration cavity, a third hole corresponding to the third acceleration cavity, a fourth hole corresponding to the fourth acceleration cavity. The first acceleration cavity and the second acceleration cavity may be in fluidic communication with a first coupling cavity of the coupling cavity assembly 220 via the first hole and the second hole, respectively. The first acceleration cavity and the second acceleration cavity may be electromagnetically coupled via the first coupling cavity. The third acceleration cavity and the fourth acceleration cavity may be in fluidic communication with a second coupling cavity of the coupling cavity assembly 220 via the third hole and the fourth hole, respectively. The third acceleration cavity and the fourth acceleration cavity may be electromagnetically coupled via the second coupling cavity. In some embodiments, the first acceleration cavity and the second acceleration cavity may be configured as an acceleration cavity unit. The third acceleration cavity and the fourth acceleration cavity may be configured as an acceleration cavity unit. In some embodiments, the second acceleration cavity and the third acceleration cavity may be integrated into one single acceleration cavity.

A coupling channel of the acceleration cavity assembly 210 may have an edge region, also referred to as a transition region or an extended region of an inner wall of the coupling channel. The edge region of the coupling channel may include at least one of a first intersection region between the inner wall of the coupling channel and an inner wall of an acceleration cavity corresponding to the coupling channel or a second intersection region between the inner wall of the coupling channel and an outer wall of the acceleration cavity assembly 210. There is no tip structure in the edge region of the coupling channel. For example, the edge region of a coupling channel may be configured with a chamfer. As another example, the edge region of a coupling channel may include continuously varying curvatures.

In some embodiments, the outer wall of the acceleration cavity assembly 210 or the main body may be configured with a plurality of grooves. A groove may include a bottom surface. In some embodiments, the bottom surface may be a plane. A groove may be configured to accommodate at least a portion of a secondary body of the coupling cavity assembly 220. A hole of the acceleration cavity assembly 210 may be configured on the bottom surface of a groove on the main body and in fluidic communication with an acceleration cavity of the acceleration cavity assembly 210. More descriptions regarding the coupling cavity assembly 220 may be found elsewhere in the present disclosure (e.g., FIGS. 3A-4A, FIG. 8, and the descriptions thereof).

The energy adjustment assembly 230 may be configured to adjust an electric field strength in the accelerating apparatus 200. In some embodiments, a position and/or a state of the energy-conditioning component 230 may be changed such that a strength distribution of the electric field in one or more acceleration cavities may be adjusted. As a result, an electric field strength in the acceleration cavity may be adjusted. In some embodiments, the energy adjustment assembly 230 may include one or more energy-conditioning components. Each of the one or more energy-conditioning components may correspond to a coupling channel of the acceleration cavity assembly 210 and be configured to open or close the coupling channel. An energy-conditioning component may also be referred to as an energy regulating switch. In some embodiments, an energy-conditioning component may include a resonant element. The resonant element may be moveable in the coupling cavity so as to adjust the electric field strength in the acceleration cavity. The resonant element may include an energy regulating rod, a transmission assembly, etc. The transmission assembly may be configured to move the energy regulating rod to close or open a coupling channel. In some embodiments, a shape and/or size of the energy regulating rod may conform to a shape and/or size of the coupling channel. For example, a shape and size of a cross section of the energy regulating rod may conform to a shape and/or size of an opening of the coupling channel. More descriptions regarding the energy-conditioning component 230 may be found elsewhere in the present disclosure (e.g., FIGS. 3A-4B and the descriptions thereof).

It should be noted that the above description of the accelerating apparatus 200 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. For example, one or more other components (e.g., a radiation source component, a power source component, etc.) may be included in the accelerating apparatus 200.

Figure 3A:
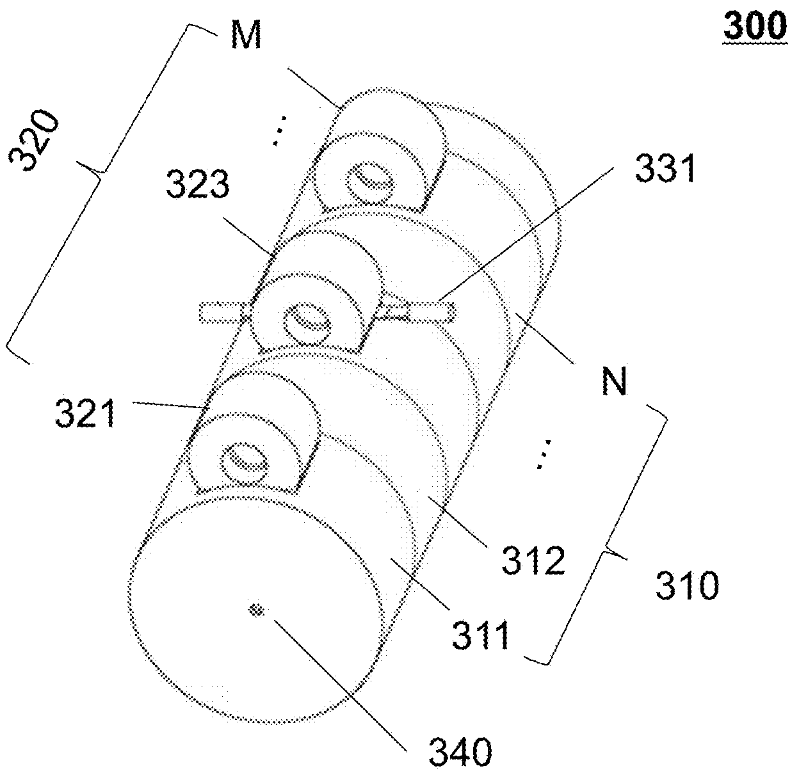
FIGS. 3A and 3B are schematic diagrams illustrating an exemplary accelerating apparatus from different perspectives according to some embodiments of the present disclosure.
Figure 3B:
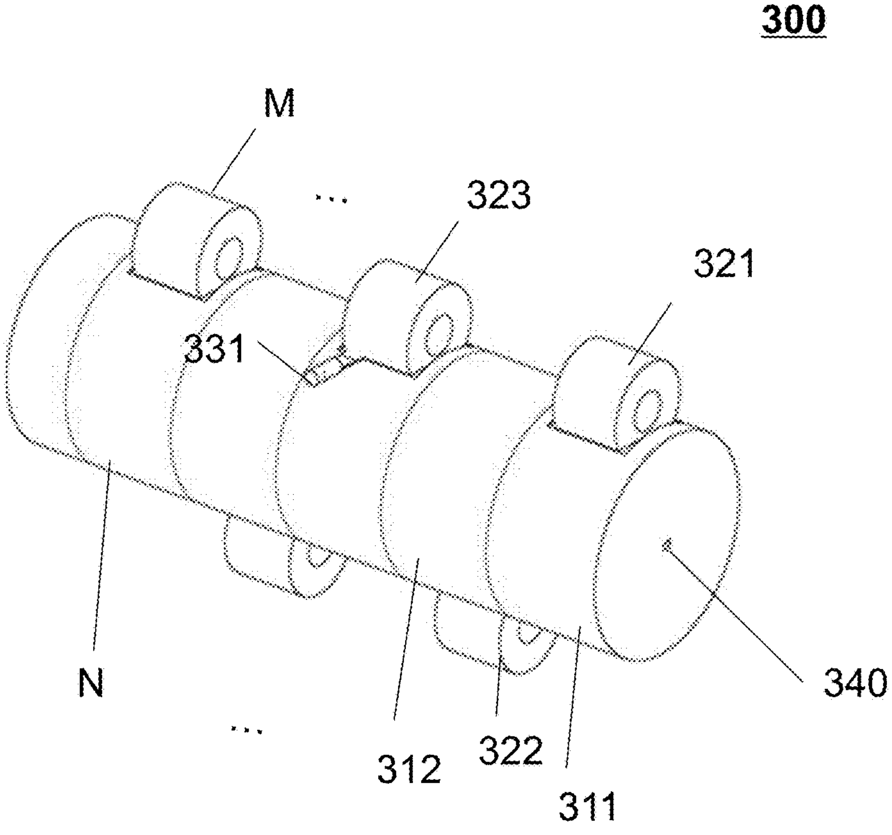
Figure 4A:
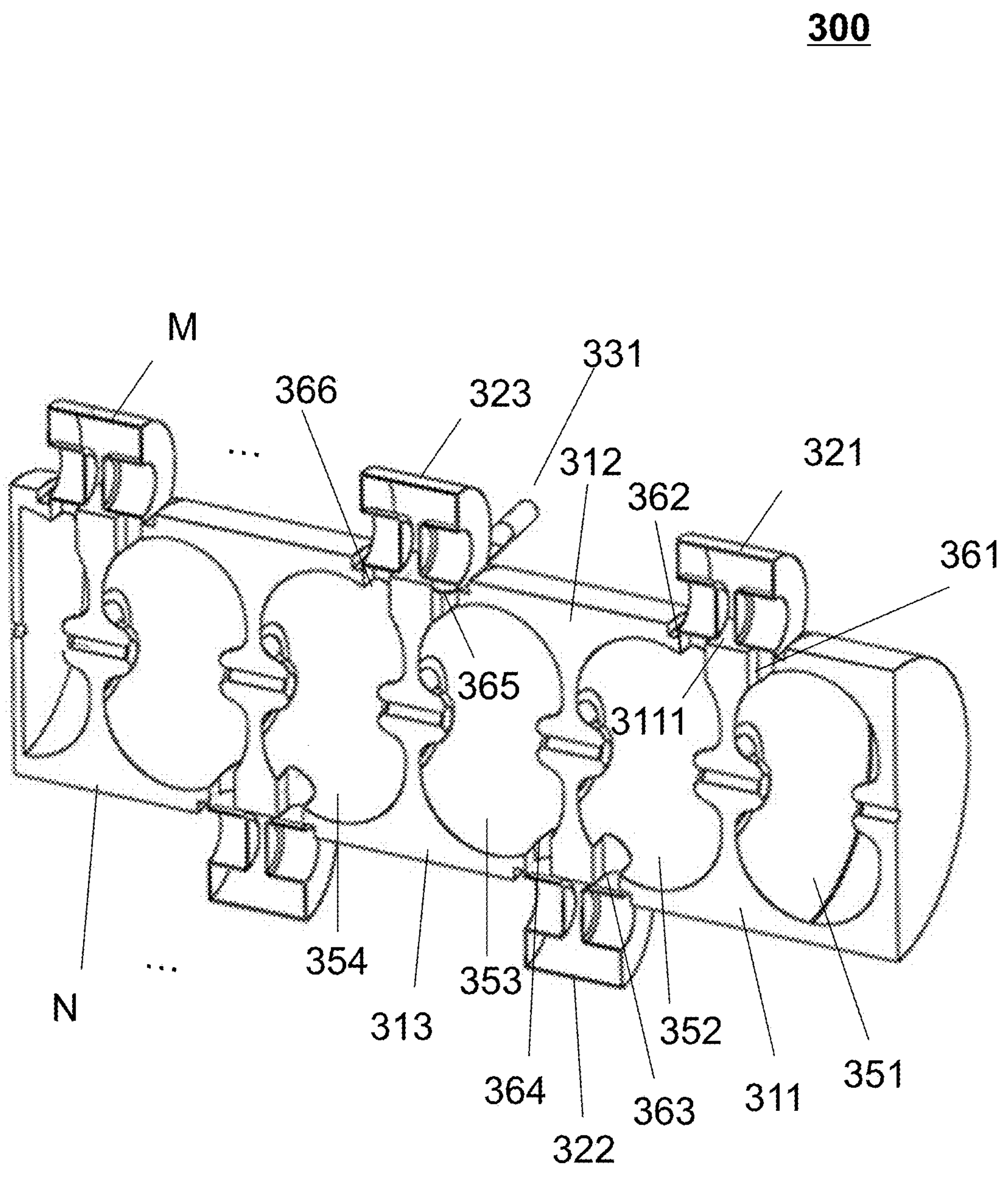
FIG. 4A illustrates a cutaway view of an exemplary accelerating apparatus shown in FIGS. 3A and 3B.

FIGS. 3A and 3B are schematic diagrams illustrating an exemplary accelerating apparatus from different perspectives according to some embodiments of the present disclosure. FIG. 4A illustrates a cutaway view of the exemplary accelerating apparatus shown in FIGS. 3A and 3B. As shown in FIGS. 3A-4A, the accelerating apparatus 300 may include a plurality of acceleration cavity units 310, a plurality of coupling cavity units 320, one or more energy-conditioning components, and a particle channel 340.

The particle channel 340 may be configured to accommodate a radiation beam to pass through. In some embodiments, the radiation beam may include a plurality of radiation particles. Exemplary radiation particles may include an electron, a positron, a proton, an antiproton, an ion, or the like, or a combination thereof. In some embodiments, the accelerating apparatus 300 may include a radiation source (not shown) configured to generate the radiation beam. For example, the radiation source may include an electron gun coupled to the accelerating apparatus 300. A radiation beam generated by the electron gun may enter the accelerating apparatus 300 from one end of the particle channel 340 and leave the particle channel 340 from another end. That is, the radiation beam may pass through the particle channel 340. In some embodiments, as shown in FIG. 4A, the plurality of acceleration cavity units 310 may be in fluidic communication via the particle channel 340. Additionally, the long axis of the particle channel 340 may coincide with a long axis of the accelerating apparatus 300.

The plurality of acceleration cavity units 310 may be configured to accelerate the radiation beam. In some embodiments, the plurality of acceleration cavity units 310 may be configured to decelerate the radiation beam. The plurality of acceleration cavity units 310 may include an acceleration cavity unit 311, an acceleration cavity unit 312, . . . , an acceleration cavity unit N. N may be a constant exceeding or equal to 0. As shown in FIGS. 3A-4A, the plurality of acceleration cavity units 310 may be arranged in sequence along a moving direction of the radiation beam. For example, the radiation beam may pass through the particle channel 340 along a straight line. Correspondingly, the plurality of acceleration cavity units 310 may be arranged along the straight line one by one. Furthermore, the long axis of each of the plurality of acceleration cavity units 310 may coincide with the straight line. In some embodiments, the plurality of acceleration cavity units 310 may be assembled with each other via a physical connection. For example, a physical connection (e.g., a welded connection) may be established between each two adjacent acceleration cavity units such that the two adjacent acceleration cavity units may be coupled together. In some embodiments, at least one of the plurality of acceleration cavity unit 310 may be detachable. For example, the acceleration cavity unit 311 may be connected with the acceleration cavity 322 via one or more physical connectors, such as a bolt connector, a screw connector, a rivet connector, etc. In some embodiments, the plurality of acceleration cavity unit 310 may be molded in one body.

The plurality of acceleration cavity units 310 may include a plurality of acceleration cavities 350, such as an acceleration cavity 351, an acceleration cavity 352, an acceleration cavity 353, . . . , an acceleration cavity N. Each of the plurality of acceleration cavity units 310 may include two acceleration cavities. Two acceleration cavities in each of the plurality of acceleration cavity units 310 may be electronically coupled. For example, the acceleration cavity unit 312 may include the acceleration cavity 352 and the acceleration cavity 353 that may be electronically coupled. Two adjacent acceleration cavity units may share one acceleration cavity. For example, the acceleration cavity unit 311 and the acceleration cavity unit 312 may share the acceleration cavity 352. The radiation particles included in the radiation beam may flow in the plurality of acceleration cavities 350 and pass through the plurality of acceleration cavities 350. In some embodiments, the plurality of acceleration cavity units 310 may accelerate the radiation particles using an electric field. For example, the accelerating apparatus 300 may be coupled with a power source (e.g., a microwave power source) which is configured to feed microwave power to the plurality of acceleration cavity units 310. Correspondingly, the electric field may be generated in the plurality of acceleration cavities 350. When the radiation beam passes through the plurality of acceleration cavities 350, radiation particles included in the radiation beam may be accelerated by the electric field to increase the energy of the radiation particles. As a result, the radiation beam may be accelerated by the plurality of acceleration cavity units 310.

The plurality of acceleration cavity units 310 may have a plurality of holes 360, such as a hole 361, a hole 362, a hole 363, a hole 364, . . . , etc. In some embodiments, each of at least a portion of the plurality of acceleration cavity units 310 may include at least two holes. Each of the at least two holes may correspond to an acceleration cavity of the each of at least a portion of the plurality of acceleration cavity units 310. For example, as shown in FIG. 4A, the acceleration cavity unit 312 may have two holes 363 and 364 corresponding to the acceleration cavity 352 and the acceleration cavity 353. In some embodiments, at least one of the plurality of holes may be located at a location where the electromagnetic field strength is maximum at an inner surface of the acceleration cavity. In some embodiments, the position where the electromagnetic field strength is the maximum in the inner surface of the acceleration cavity may be the middle section of the inner surface of the half of the acceleration cavity. In some embodiments, the at least one of the plurality of holes may be located at the middle section of the inner surface of the half of the acceleration cavity. Detailed descriptions connecting with the middle section please refer to FIGS. 5 and 6. In some embodiments, at least one of the plurality of holes may be located at a location of the inner surface of the acceleration cavity where the electromagnetic field strength satisfies a condition. The condition may include that a ratio of the electromagnetic field strength and the maximum electromagnetic field strength at the inner surface of the acceleration cavity exceeds a threshold. The maximum electromagnetic field strength may be an maximum electromagnetic field strength of the inner surface of the acceleration cavity when a hole of the acceleration cavity is open completely. The threshold may be 70%, 75%, 80%, 85%, 90%, 95%, 96%, 97%, 98%, or 99%, etc. . . . In other words, at least one of the plurality of holes may be located at a location of the inner surface of the acceleration cavity where the electromagnetic field strength is more than 70%, 75%, 80%, 85%, 90%, 95%, 96%, 97%, 98%, or 99% of the maximum electromagnetic field strength at the inner surface of the acceleration cavity.

In some embodiments, as shown in FIG. 4A, an outer wall of each of at least a portion of the plurality of acceleration cavity units 310 may be configured with a groove including a first bottom surface. The groove may be configured to accommodate at least a portion of one of the plurality of coupling cavity units 320. A coupling cavity unit located in the groove may include a second bottom surface. The shape of the first bottom surface of the groove may confirm with the shape of the second bottom surface of the coupling cavity unit. For example, the first bottom surface may include a first plane (e.g., a first plane 3111) and the second surface may include a second plane. More descriptions regarding an acceleration cavity unit may be found elsewhere in the present disclosure (e.g., FIGS. 5-7 and the descriptions thereof).

The plurality of coupling cavity units 320 may be configured to electromagnetically couple the plurality of acceleration cavities 350 included in the plurality of acceleration cavity units 310. For example, the plurality of coupling cavity units 320 may include a coupling cavity unit 321, a coupling cavity unit 322, a coupling cavity unit 323, . . . , M. The coupling cavity unit 321 may be configured to electromagnetically couple the acceleration cavity 351 and the acceleration cavity 352. The coupling cavity unit 322 may be configured to electromagnetically couple the acceleration cavity 352 and the acceleration cavity 353. In some embodiments, each of the plurality of coupling cavity units 320 may include a coupling cavity. The each of the plurality of coupling cavity units 320 may electromagnetically couple adjacent acceleration cavities via the coupling cavity. For example, one of the plurality of coupling cavity units 320 (e.g., the coupling cavity unit 321) may be physically connected (e.g., via a welded connection) with the first plane (e.g., the first plane 3111) of one of the plurality of acceleration cavity units 310 (e.g., the acceleration cavity unit 311). The coupling cavity of the one of the plurality of coupling cavity units 320 (e.g., the coupling cavity unit 321) and two holes (e.g., the hole 361 and the hole 362) configured in the one of the plurality of acceleration cavity units 310 (e.g., the acceleration cavity unit 311) may form a channel for microwave power transmission. As a result, the two adjacent acceleration cavities (e.g., the acceleration cavity 351 and the acceleration cavity 352) in the one of the plurality of acceleration cavity units 310 (e.g., the acceleration cavity unit 311) may be electromagnetically coupled via the coupling cavity.

In some embodiments, the plurality of coupling cavity units 320 may be disposed on both sides of the long axis of the plurality of acceleration cavity units 310 (or the accelerating apparatus 300). For example, as shown in FIG. 3B and FIG. 4A, a portion of the plurality of coupling cavity units 320 may be disposed on one side of the long axis, and the other portion of the plurality of coupling cavity units 320 may be disposed on the other side of the long axis. In some embodiments, each of the plurality of coupling cavity units 320 may correspond to one of the plurality of coupling cavity units 320. For example, as shown in FIG. 3B and FIG. 4A, one coupling cavity unit may be coupled on one acceleration cavity unit on one side of the long axis. And another coupling cavity unit may be coupled on an adjacent acceleration cavity unit on the other side of the long axis.

Figure 8:
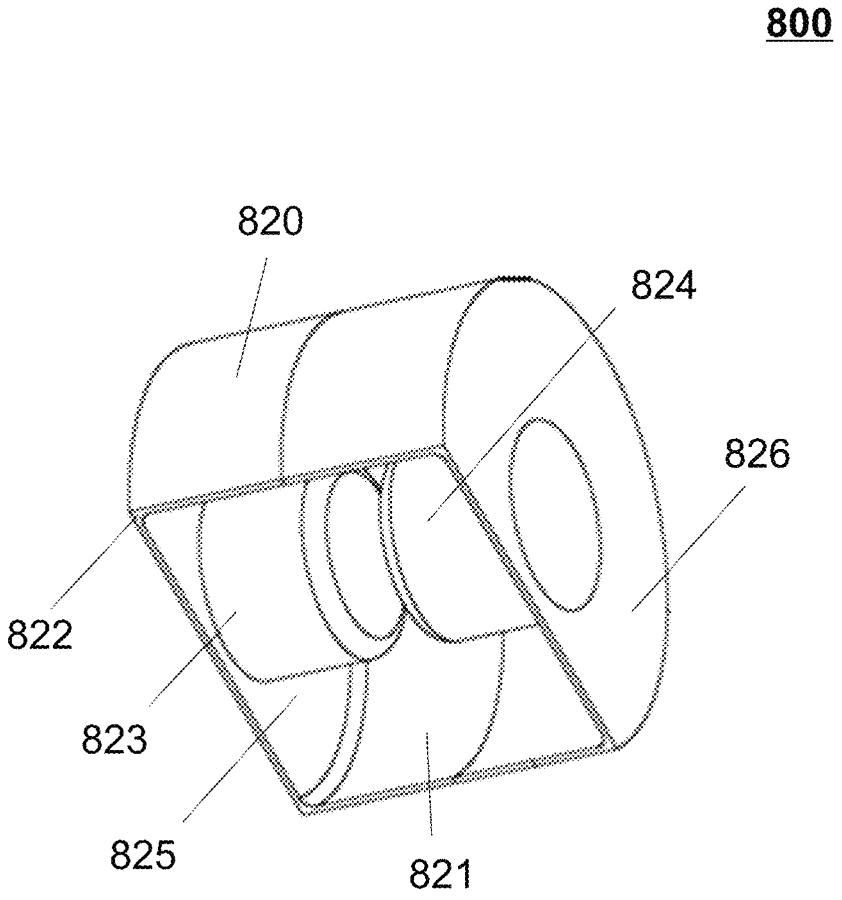
FIG. 8 is a schematic diagram illustrating an exemplary coupling cavity unit according to some embodiments of the present disclosure.

More descriptions regarding a coupling cavity unit may be found elsewhere in the present disclosure (e.g., FIG. 8 and the descriptions thereof).

The one or more energy-conditioning components may be configured to adjust an electric field strength in the accelerating apparatus 300. In some embodiments, each of the one or more energy-conditioning components may be configured to adjust an electric field strength of an acceleration cavity. In some embodiments, a position and/or a state of the each of the one or more energy-conditioning components may be changed such that a strength distribution of the electric field in an acceleration cavity corresponding to the each of one or more energy-conditioning components may be adjusted. As a result, an electric field strength in the acceleration cavity may be adjusted. Take a standing wave acceleration tube operating in a homo-source dual-beam mode as an example, one or more energy-conditioning components may be used in the standing wave acceleration tube to achieve the homo-source dual-beam mode. As used herein, the homo-source dual-beam mode may refer to a working mode in which an acceleration tube may generate radiation beams (also referred to as electron beams) with energies of different intensities. For example, the radiation beams with energies of different intensities may include a high-energy radiation beam for radiation therapy and a low-energy radiation beam for medical imaging. In some embodiments, the standing wave acceleration tube may generate radiation beams with energies of different intensities using the one or more energy-conditioning components. In some embodiments, positions of the one or more energy-conditioning components may be determined according to actual needs. For example, the accelerating apparatus 300 may be divided into a bunching segment including a portion of the plurality of acceleration cavity units 310 and an accelerating segment including the other portion of the plurality of acceleration cavity units 310. When the radiation particles pass through the accelerating apparatus 300, the radiation particles may be gathered and accelerated under an electric field generated in the bunching segment, and may be further accelerated under an electric field generated in the accelerating segment. In order to obtain well-gathered radiation particles, the electric field in the bunching segment may remain stable. That is, the one or more energy-conditioning components may be disposed at a position accelerating segment. As another example, as the radiation particles move forward in the accelerating apparatus 300, an energy of the radiation particles may be increased continuously. An output energy of the radiation particles may be adjusted by adjusting the positions of the one or more energy-conditioning components.

In some embodiments, at least one of the one or more energy-conditioning components may include a resonant element (e.g., a resonant element 331). The resonant element (e.g., the resonant element 331) may adjust a resonant mode (e.g., a resonant frequency) of microwave power transmitted in one of the plurality of coupling cavity units 320 (e.g., the coupling cavity unit 323) so as to change a strength distribution of an electric field in an acceleration cavity (e.g., the acceleration cavity 353) (supposing that a moving direction of the radiation particles is from the acceleration cavity unit N to the acceleration cavity unit 311) corresponding to the resonant element may be adjusted. In some embodiments, the resonant element (e.g., a resonant element 331) may include an energy regulating rod (e.g., a metal rod) configured to open or close a hole of an acceleration cavity unit associated with the resonant element. In some embodiments, the resonant element may include a transmission assembly (not shown). The transmission assembly may be configured to drive the energy regulating rod to move. For example, the transmission assembly may include a ball screw transmission assembly. The energy regulating rod may be driven to move for closing or opening a coupling cavity or opening or closing a hole of an acceleration cavity unit associated with the energy-conditioning component.

For purpose of illustration, taking the resonant element 331 as an example, the resonant element 331 may move in a coupling cavity of the coupling cavity unit 323 to open or close the coupling cavity or a hole 365 of the acceleration cavity unit 313 associated with the resonant element 331, thereby adjusting the electric field strength in the acceleration cavity unit 313. In some embodiments, the resonant element 331 may be moveable between the first plane of the acceleration cavity unit 313 and the second plane of the coupling cavity unit 323 in a direction parallel to the first plane to close or open the hole 365 located at the first plane of the acceleration cavity unit 313. As a result, a resonant frequency of microwave power transmitted in the acceleration cavity 353 and the acceleration cavity 354 of the acceleration cavity unit 313 may be detuned. That is, an electric field strength in the acceleration cavity 353 and the acceleration cavity 354 of the acceleration cavity unit 313 may be adjusted. In some embodiments, a state of the hole 365 may correspond to a degree of detuning in the acceleration cavity 353 and the acceleration cavity 354 of the acceleration cavity unit 313. For example, the larger a closed part of the hole 365, the greater the degree of detuning of a resonant frequency of microwave power in the acceleration cavity 353 and the acceleration cavity 354 may be, and correspondingly, the greater the adjustment of electric field strength of the acceleration cavity unit 313 may be. In some embodiments, a maximum moving distance of the resonant element 331 may be greater than or equal to a length of the hole 365 in a moving direction of the resonant element 331. In this case, the one of the plurality of holes 360 may be closed or opened completely by moving the resonant element 331. For example, if the hole 365 is an oval hole with a long axis perpendicular to the long axis of the plurality of acceleration cavity units 310, the maximum moving distance of the resonant element 331 may be greater than or equal to a length of the long axis of the holes 365. In some embodiments, when the hole 365 is entirely covered by the resonant element 331 to be closed, the electric field strength of the acceleration cavity 353 may be zero or approximately zero. In other words, when the hole 365 is entirely covered by the resonant element 331, the resonant frequency of the microwave power transmitted in the acceleration cavity 353 may be detuned completely or approximately completely. As a result, the electric field strength in the acceleration cavity 353 may be zero or approximately zero. The condition that the electric field strength is approximately zero may indicate that the electric field strength may be less than 10%, 5%, 4%, 3%, 2%, 1%, 0.5%, 0.4%, 0.3%, 0.2%, 0.1%, 0.05%, or 0.01% of the maximum electric field strength when the hole 365 is open completely. In some embodiments, when the hole 365 is at least partially covered by the resonant element 331 to be at least partially closed, the electric field strength of the acceleration cavity 353 may be less than a threshold. The threshold may be a percentage of the maximum electric field strength when the hole 365 is open completely. The percentage of the maximum electric field strength may be 20%, 15%, 10%, 5%, 4%, 3%, 2%, 1%, 0.5%, 0.1%, or 0.01% of the maximum electric field strength. In other words, when the hole 365 is at least partially covered by the resonant element 331 to be at least partially closed, the electric field strength of the acceleration cavity 353 may be less than 20%, 15%, 10%, 5%, 4%, 3%, 2%, 1%, 0.5%, 0.1%, or 0.01% of the maximum electric field strength. In some embodiments, the covered percentage of the hole 365 covered by the resonant element 331 may be inversely proportional to the electric field strength of the acceleration cavity 353. Merely as an example, as the covered percentage of the hole 365 gradually increases, the electric field strength of the acceleration cavity 353 may gradually decrease. A desired electric field strength of the acceleration cavity 353 may be tuned by adjusting the covered percentage of the hole 365 covered by the resonant element 331, in other words, by adjusting the position of the resonant element 331 relative to the hole 365, or by adjusting a move distance of the resonant element 331 along the direction parallel to the first plane.

Figure 4B:
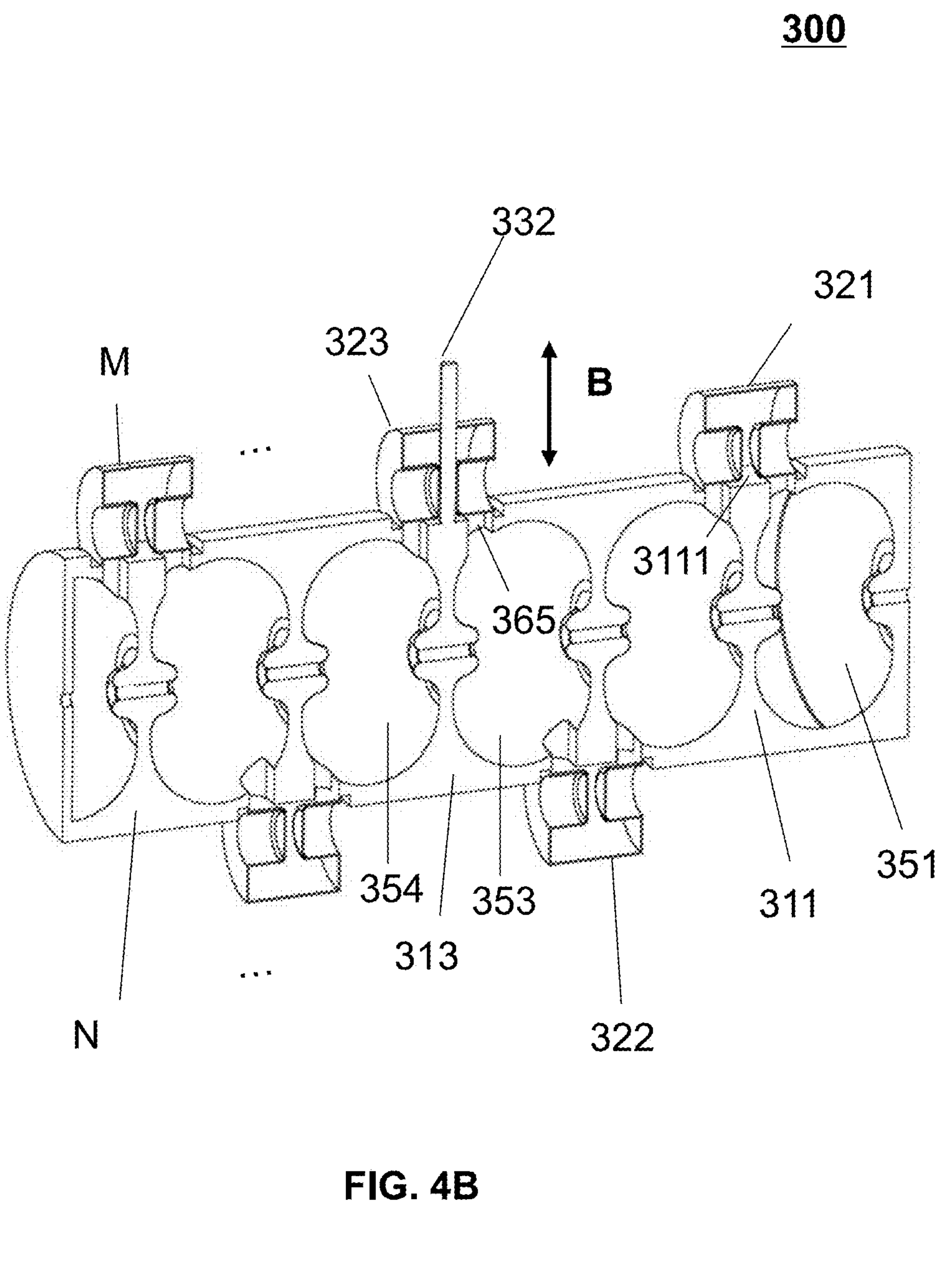
FIG. 4B illustrates a cutaway view of another exemplary accelerating apparatus shown in FIGS. 3A and 3B with another energy-conditioning component according to some embodiments of the present disclosure.

In some embodiments, the resonant element may be moveable in a direction perpendicular to the first plane of the acceleration cavity unit 313. In some embodiments, when the resonant element moves in the direction perpendicular to the first plane of the acceleration cavity unit 313, the resonant element may be capable of contacting the first plane. For illustration purpose, FIG. 4B illustrates a cutaway view of an exemplary accelerating apparatus shown in FIGS. 3A and 3B with another energy-conditioning component according to some embodiments of the present disclosure. As shown in FIG. 4B, the energy-conditioning component may include a resonant element 332. The resonant element 332 may insert into the coupling cavity of the coupling cavity unit 323 and may be moveable in a direction B perpendicular to the first plane of the acceleration cavity unit 313. When the resonant element 332 moves in the direction B perpendicular to the first plane, the resonant element 332 may be capable of contacting the first plane. As a result, a resonant frequency of microwave power transmitted in the acceleration cavity 353 and the acceleration cavity 354 of the acceleration cavity unit 312 may be detuned. That is, an electric field strength in the acceleration cavity 353 and the acceleration cavity 354 of the acceleration cavity unit 312 may be adjusted.

In some embodiments, an end face of the resonant element 332 may be a flat. In this case, the resonant element 332 may fully contact the first plane via the end face, which may improve a detuning effect of the energy-conditioning component. Additionally, a radial dimension (i.e., a dimension in the direction B) of the coupling cavity unit 323 may be reduced because of the second plane, which may further reduce a moving distance of the resonant element 332. Correspondingly, a service life of the accelerating apparatus 300 may be increased and an overall volume of the accelerating apparatus 300 may be reduced such that the accelerating apparatus 300 may be installed in a narrow mechanical mechanism, which may improve stability in controlling a movement of the resonance element 332.

In some embodiments, the energy-conditioning component in the present disclosure may be used in devices that can work in a homo-source dual-beam mode. For example, the energy-conditioning component may be used in an IGRT device for adjusting output energies of the IGRT device. In an image-guided radiotherapy, the IGRT device may generate a high-energy radiation beam for radiation therapy and a low-energy radiation beam for medical imaging effectively. As a result, quality of images used for diagnosis may be improved and a function of online diagnosis during radiotherapy may be enhanced. Additionally, when using an energy adjustment technology in the prior art to perform a detuned energy adjustment on an accelerating apparatus (e.g., a standing wave accelerating tube), a frequency drift may occur in the accelerating apparatus. Moreover, a mode interval and/or a band gap factor of the accelerating apparatus may increase. While when using the energy-conditioning component provided in the present disclosure for an energy adjustment, the mode interval and/or the band gap factor of the accelerating apparatus may not be changed. In this case, the accelerating apparatus may work in a $\pi/2$ mode normally and stably, which may further reduce a loss of the accelerating apparatus.

It should be noted that the above description of the accelerating apparatus 300 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. For example, FIGS. 3A-4A illustrate only one resonant element 331 included in an energy-conditioning component. However, there may be two or more energy-conditioning components disposed on the accelerating apparatus 300. As another example, the accelerating apparatus 300 may include one or more additional components and/or one or more components of the accelerating apparatus 300 described above may be omitted. As a further example, two or more components of the accelerating apparatus 300 may be integrated into a single component. A component of the accelerating apparatus 300 may be implemented on two or more sub-components.

In addition, a position, a shape, and/or a size of a component of the accelerating apparatus 300 as shown in FIGS. 3A-4B are illustrative, and the component may be mounted at any position and have any size and/or shape. Moreover, a connection between two components as illustrated in figures and described above may be variable. For example, a connection between two components may include a welded connection, a key connection, a pin connection, an interference fit connection, or the like, or any combination thereof.

Figure 5:
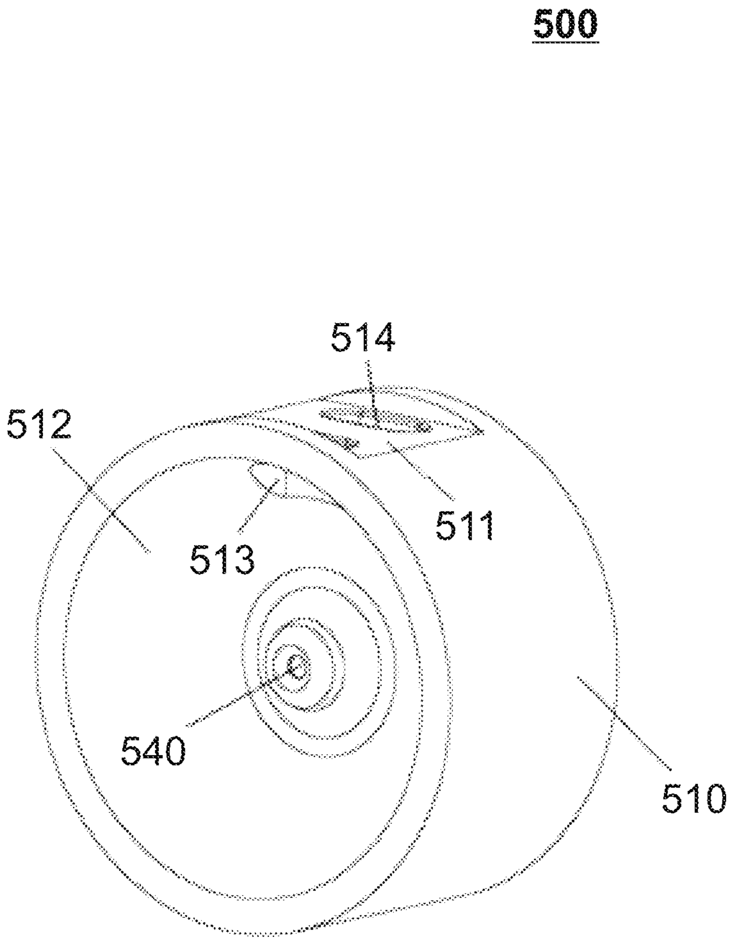
FIG. 5 is a schematic diagram illustrating an exemplary acceleration cavity unit according to some embodiments of the present disclosure.

FIG. 5 is a schematic diagram illustrating an exemplary acceleration cavity unit according to some embodiments of the present disclosure. As shown in FIG. 5, the acceleration cavity unit 500 may include a body 510, a first acceleration cavity 512, a second acceleration cavity (not shown), a first hole 513, a second hole 514, and a particle channel 540. The first acceleration cavity 512 and the second acceleration cavity may be in fluidic communication via the channel 540, such that radiation particles may flow between the first acceleration cavity 512 and the second acceleration cavity.

Figure 6:
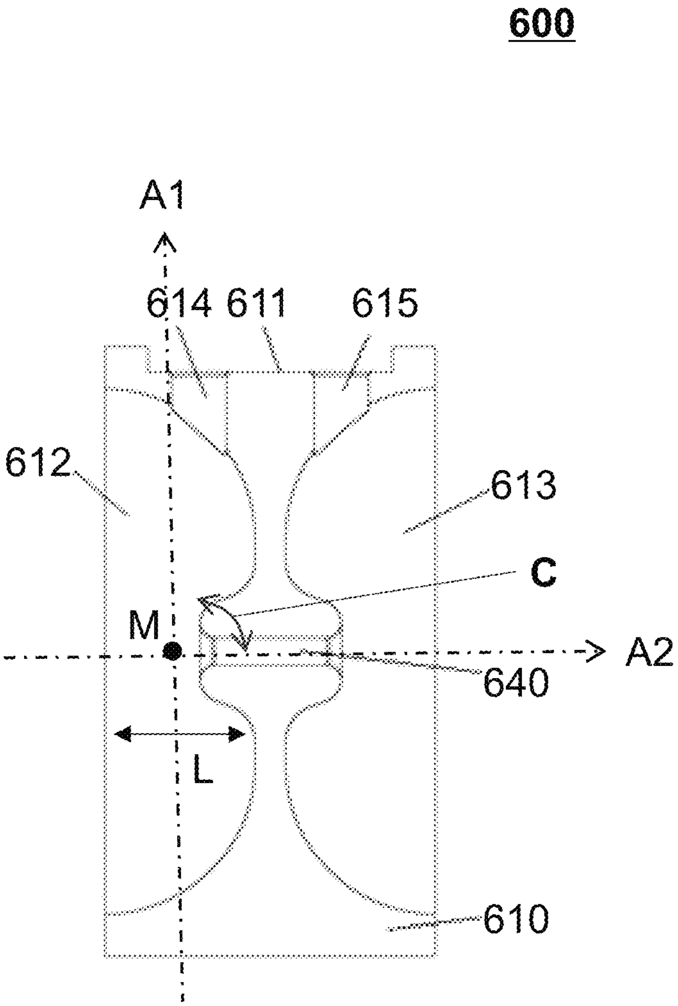
FIG. 6 illustrates a cutaway view of an exemplary acceleration cavity unit according to some embodiments of the present disclosure.
Figure 7:
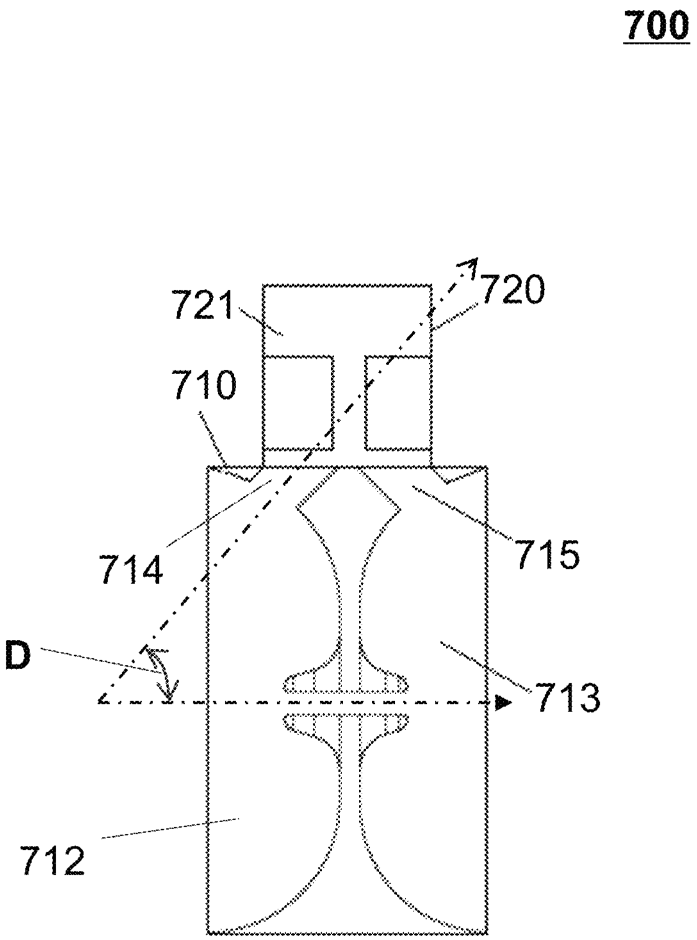
FIG. 7 illustrates a cutaway view of an exemplary acceleration cavity unit according to some embodiments of the present disclosure.

In some embodiments, the acceleration cavity unit 500 may have any shape and/or size. Merely by way of example, as shown in FIG. 5, an outer wall the acceleration cavity unit 500 may be a cylindrical. In some embodiments, an inner wall of at least one of the first acceleration cavity 512 and the second acceleration cavity may include continuously varying curvatures. For illustration purpose, FIGS. 6 and 7 illustrate cutaway views of exemplary acceleration cavity units according to some embodiments of the present disclosure. As shown in FIGS. 6 and 7, the acceleration cavity unit 600 (and/or acceleration cavity unit 700) may include two acceleration cavities that are symmetrical along a vertical line (i.e., a line passing through a center of the acceleration cavity unit 600 (and/or acceleration cavity unit 700) and perpendicular to the long axis) of the acceleration cavity unit 600 (and/or acceleration cavity unit 700). Additionally, each of the acceleration cavities may be hemispherical with continuously varying curvatures.

In some embodiments, when an accelerating apparatus is fed with a high microwave power, an electromagnetic field with a high energy may be generated in the accelerating apparatus. The electromagnetic field may be concentrated on inner surfaces of the accelerating apparatus and form Poynting vectors that may cause breakdowns in the accelerating apparatus. In some embodiments, a breakdown rate of the accelerating apparatus may follow an equation:

$$\frac{E_a^{30} \cdot t_p^5}{BDR} = const. \tag{1}$$

where E refers to an electric field strength in the accelerating apparatus, t refers to a microwave pulse width, and BDR refers to a breakdown rate of the accelerating apparatus. The microwave pulse width t may be related to a thermal effect of a magnetic field on the inner surfaces of the accelerating apparatus. The larger the microwave pulse width is, the stronger the thermal effect of the magnetic field on the inner surfaces of the accelerating apparatus may be. Further, a breakdown may be caused by a field emission of an electric field in the accelerating apparatus when temperature on the inner surfaces rises to a certain value.

As illustrated in equation (1), the electric field strength E may be positively related to the breakdown rate of the accelerating apparatus. In the prior art, an acceleration cavity unit may intersect with a coupling cavity unit directly. Intersection regions between the acceleration cavity unit and the coupling cavity unit may include cutting edges (e.g., a tip structure) with high current densities. Correspondingly, an electric field with a high strength may be distributed around the cutting edges, which may increase the breakdown rate of the accelerating apparatus and reduce stability and reliability of the accelerating apparatus during operation.

The first hole 513 and the second hole 514 of the acceleration cavity unit 500 may be configured to be in fluidic communication with a corresponding coupling cavity. In this case, a direct intersection between the acceleration cavity unit 510 and a coupling cavity unit may be avoided such that cutting edges included in the intersection regions may be removed. For example, instead of intersecting directly, a coupling cavity unit (not shown) may be coupled on an outer wall of the acceleration cavity unit 500 at a position (e.g., a plane 511) corresponding to the hole 513 and the hole 514. As a result, the direct intersection between the acceleration cavity unit 510 and the coupling cavity unit may be avoided. Correspondingly, a breakdown rate in the acceleration cavity unit 500 (or the accelerating apparatus) may be reduced. Alternatively or additionally, the first hole 513 and the second hole 514 may be symmetrical with respect to a radial plane (i.e., a plane passing through a center of the coupling cavity unit and perpendicular to the long axis of the acceleration cavity unit 500) of the coupling cavity unit.

An edge region of the first hole 513 and/or the edge region of the second hole 514 may include continuously varying curvatures. In some embodiments, the edge region of the first hole 513 may include a first intersection region between an inner wall of the first hole 513 and an inner wall of the first acceleration cavity 512, a second intersection region between the inner wall of the first hole 513 and an outer wall of the acceleration cavity unit 500 (e.g., the plane 511), or the like, or any combination thereof. In some embodiments, the edge region of the second hole 514 may include a first intersection region between an inner wall of the second hole

514 and an inner wall of the acceleration cavity, a second intersection region between the inner wall of the second hole 513 and an outer wall of the acceleration cavity unit 500 (e.g., the plane 511), or the like, or any combination thereof. In some embodiments, the edge region of the first hole 513 and/or the edge region of the second hole 514 may be configured with a filleted corner such that the edge region of the first hole 513 and/or the edge region of the second hole 514 include the continuously varying curvatures, which may avoid tip structures exist in the edge region of the first hole 513 and/or the edge region of the second hole 514. Merely by way of example, a radius of the filleted corner may be 0.6 mm, 0.8 mm, 1 mm, etc. In some embodiments, the edge region of the first hole 513 and/or the edge region of the second hole 514 may be configured with chamfers, which may avoid tip structures exist in the edge region of the first hole 513 and/or the edge region of the second hole 514. Merely by way of example, an angle of the chamfer in the edge region of the first hole 513 and/or the second hole 514 may be 45 degrees. Continuously varying curvatures and/or the chamfer may reduce a current density of the edge region such that an electric field strength of the edge region may be reduced. Correspondingly, a breakdown rate of the accelerating apparatus 500 may be reduced.

The first hole 513 and/or the second hole 514 may be located at any position of body 510 to make the acceleration cavity unit 500 electromagnetically couple adjacent coupling cavities. In some embodiments, the first hole 513 may be located at a position where the electromagnetic field strength is the maximum in the inner surface of the first acceleration cavity 512. In some embodiments, the first hole 513 may be located at a position of the inner surface of the first acceleration cavity 512 where the electromagnetic field strength satisfies a condition. The condition may include that a ratio of the electromagnetic field strength and the maximum electromagnetic field strength at the inner surface of the first acceleration cavity 512 exceeds a threshold. The maximum electromagnetic field strength may be an maximum electromagnetic field strength of the inner surface of the first acceleration cavity 512 when the first hole 513 of the first acceleration cavity 512 is open completely. The threshold may be 70%, 75%, 80%, 85%, 90%, 95%, 96%, 97%, 98%, or 99%, etc. . . . In some embodiments, the second hole 514 may be located at a position where the electromagnetic field strength is the maximum in the inner surface of the second acceleration cavity. In some embodiments, the second hole 514 may be located at a position of the inner surface of the second acceleration cavity where the electromagnetic field strength satisfies a condition. The condition may include that a ratio of the electromagnetic field strength and the maximum electromagnetic field strength at the inner surface of the second acceleration cavity exceeds a threshold. The maximum electromagnetic field strength may be an maximum electromagnetic field strength of the inner surface of the second acceleration cavity when the second hole 514 of the second acceleration cavity is open completely. The threshold may be 70%, 75%, 80%, 85%, 90%, 95%, 96%, 97%, 98%, or 99%, etc. . . . In some embodiments, the position where the electromagnetic field strength is the maximum in the inner surface of the first acceleration cavity 512 may be the middle section of the inner surface of the first acceleration cavity 512. In some embodiments, the position where the electromagnetic field strength is the maximum in the inner surface of the second acceleration cavity may be the middle section of the inner surface of the second acceleration cavity. As used herein, the middle section of an inner surface of an acceleration cavity refers to a region of the inner surface whose projection along a direction (e.g, direction denoted by arrow A1 as shown in FIG. 6) perpendicular to the moving direction (e.g, direction denoted by arrow A2 as shown in FIG. 6) of the radiation beam in the acceleration cavity includes a mid-point (e.g, a mid-point M as shown in FIG. 6) of the acceleration cavity along the moving direction of the radiation beam. As shown in FIG. 5, a half of the first acceleration cavity 512 is presented in FIG. 5. The maximum length of the half of the first acceleration cavity 512 along a moving direction of the radiation beam may be L (e.g, the length L denoted as shown in FIG. 6), and the electromagnetic field strength at the section of the inner surface whose projection along the direction (e.g, direction denoted by arrow A1 as shown in FIG. 6) perpendicular to the moving direction (e.g, direction denoted by arrow A2 as shown in FIG. 6) of the radiation beam is located at the ½ L (e.g, the mid-point M as shown in FIG. 6) of the half of the first acceleration cavity 512 may be the maximum. In other words, the electromagnetic field strength at the cross section of the first acceleration cavity 512 along the direction perpendicular to the moving direction of the radiation beam at the ½ L (e.g, the mid-point M as shown in FIG. 6) of the half of the first acceleration cavity 512 may be the maximum.

The shape of one end of the first hole 513 on the inner surface of the first acceleration cavity 512 may coincide with or conform the middle section of the inner surface of the first acceleration cavity 512. The shape of one end of the second hole 514 on the inner surface of the second acceleration cavity may coincide with or conform the middle section of the inner surface of the second acceleration cavity.

In some embodiments, the first hole 513 and/or the second hole 514 may have an oblong shape(s). For example, the first hole 513 and/or the second hole 514 may be a waist-shaped hole(s), an oval hole, or the like. In some embodiments, the oblong shape may allow the first hole 513 and/or the second hole 514 to be disposed to the maximum extent in a limited space on the acceleration cavity unit 500. In some embodiments, a long axis of the first hole 513 and/or the second hole 514 is perpendicular to a moving direction of the radiation beam. Furthermore, the oblong shape may increase a magnetic flux of the first hole 513 and/or the second hole 514 so as to improve efficiency of microwave coupling. Moreover, the oblong shape may increase a shunt impedance (i.e., a measure of a strength with which an eigenmode of an acceleration cavity interacts with particles on a given straight line (e.g., the long axis of the acceleration cavity unit 500)) of the accelerating apparatus. Merely by way of example, as shown FIG. 5, each of the first hole 513 and the second hole 514 may be a waist-shaped hole. A width of the waist-shaped hole may be in a range from 7 millimeters to 11 millimeters, or from 8 millimeters to 10 millimeters, etc. A length of the waist-shaped hole may be in a range from 15 millimeters to 25 millimeters, or from 10 millimeters to 20 millimeters, etc. A radius R of a semicircle hole on a side of the waist-shaped hole may be in a range from 4 millimeters to 6 millimeters, or from 2 millimeters to 8 millimeters, etc.

The acceleration cavity unit 500 may be configured with a groove on the outer wall of the acceleration cavity unit 500. The groove may be configured to accommodate at least a portion of a coupling cavity unit. The groove may include a bottom surface 511 that may be a plane (i.e., a first plane). The plane may be used as a mounting surface of a coupling cavity unit. For example, the coupling cavity unit may also include a bottom surface that may be a plane (i.e., a second plane). The first plane may be physically connected (e.g., via a welded connection) with the second plane. As a result, the first acceleration cavity 512 and the second acceleration cavity may be electromagnetically coupled via a coupling cavity of the coupling cavity unit. Moreover, in a machining process, the coupling cavity unit may be precisely coupled with the acceleration cavity unit 500 via the first plane and the second plane, which may improve machining efficiency and a machining accuracy of the accelerating apparatus 300. In some embodiments, the first plane may be parallel to a long axis of the acceleration cavity unit 500 (or the accelerating apparatus). The second plane may be parallel to a long axis of the coupling cavity unit.

It should be noted that the above description of the acceleration cavity unit 500 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. For example, FIG. 5 illustrates only two holes. However, there may be three or more holes included in the acceleration cavity unit 500. As another example, the plurality of holes may have any other position and have any size and/or shape. As a further example, the acceleration cavity unit 500 may include other mounting surfaces for a coupling cavity unit. For instance, the first plane 312 may not be parallel to the long axis of the accelerating apparatus. For further instance, the first plane may be replaced by a curved surface.

FIG. 6 illustrates a cutaway view of an exemplary acceleration cavity unit according to some embodiments of the present disclosure. The acceleration cavity unit 600 as shown in FIG. 6 may be similar to or same as the acceleration cavity unit 500 as described in FIG. 5. For example, the acceleration cavity unit 600 may include a body 610, a first acceleration cavity 612, a second acceleration cavity 613, a first hole 614, a second hole 615, and a particle channel 640. The first acceleration cavity 612 and the second acceleration cavity 613 may be in fluidic communication via the particle channel 640, such that radiation particles may flow between the first acceleration cavity 612 and the second acceleration cavity 613. As another example, an edge region of the first hole 614 and the second hole 615 may include continuously varying curvatures.

An angle C between a central axis of each of the first hole 614 and the second hole 615 and a long axis of the acceleration cavity unit 600 may be 90 degrees. In other words, the first hole 614 and the second hole 615 may be perpendicular to the long axis of the acceleration cavity unit 600. In some embodiments, the angle between the central axis of each of the first hole 614 and the second hole 615 and the long axis of the acceleration cavity unit 600 being 90 degrees may be easy for machining, which may increase a machining efficiency of the acceleration cavity unit 600 (or the accelerating apparatus).

FIG. 7 illustrates a cutaway view of an exemplary acceleration cavity unit according to some embodiments of the present disclosure. The acceleration cavity unit 700 as shown in FIG. 7 may be similar to or same as the acceleration cavity unit 500 as described in FIG. 5. For example, the acceleration cavity unit 700 may include a body 710, a first acceleration cavity 712, a second acceleration cavity 713, a first hole 714, a second hole 715, and a particle channel 740. The first acceleration cavity 712 and the second acceleration cavity 713 may be in fluidic communication via the particle channel 740, such that radiation particles may flow between the first acceleration cavity 712 and the second acceleration cavity 713. As another example, an edge region of the first hole 714 and the second hole 715 may include continuously varying curvatures.

An angle D between a central axis of the first hole 714 (or the second hole 715) and a long axis of the acceleration cavity unit 700 may be in a range from 0 degrees to 90 degrees. In one aspect, a direct intersection between the acceleration cavity unit 700 and a coupling cavity unit (e.g., a coupling cavity unit 720) may be avoided. In another aspect, cutting edges (e.g., a tip structure) in the first intersection region between the inner wall of the hole 714 and an inner wall of the first acceleration cavity 712 and cutting edges (e.g., a tip structure) in the first intersection region between the inner wall of the hole 715 and an inner wall of the second acceleration cavity 713 may be avoided, which may further reduce a breakdown rate of the accelerating apparatus.

FIG. 8 is a schematic diagram illustrating an exemplary coupling cavity unit according to some embodiments of the present disclosure. As shown in FIG. 8, the coupling cavity unit 800 may include a body 820, a coupling cavity 821, a plane 822, a first nose-cone 823, and a second nose-cone 824.

In some embodiments, the coupling cavity unit 800 may have any shape and/or size. Merely by way of example, as shown in FIG. 8, an outer wall of the coupling cavity unit 800 may be a circular arc. In some embodiments, the plane 822 may be obtained by axially cutting the body 820. In some embodiments, the plane 822 (i.e., a second plane) may be physically connected with a first plane of an acceleration cavity unit (e.g., the acceleration cavity unit 500 as described in FIG. 5). That is, the coupling cavity unit 800 may be coupled with the acceleration cavity unit via the first plane and the second plane 822. In some embodiments, the second plane 822 may be parallel to a long axis of the coupling cavity unit 800. As used herein, the long axis of the coupling cavity unit 800 may refer to a central axis passing through the first nose-cone 823 and the second nose-cone 824. That is, the long axis of the coupling cavity unit 800 may coincide with the central axis of the first nose-cone 823 and the second nose-cone 824.

In some embodiments, as shown in FIG. 8, a portion of a first end 825 of the coupling cavity unit 800 may be recessed inward so as to form the first nose-cone 823 and a portion of a second end 826 of the coupling cavity unit 800 may be recessed inward so as to form the second nose-cone 824. Each of the first nose-cone 823 and the second nose-cone 824 may have a closed end. An outer wall of at least one of the first nose-cone 823 and the second nose-cone 824 may be a cylindrical. A distance between the closed end of the first nose-cone 823 to the first end 825 (i.e., the length of the first nose-cone 823) may be the same as or different from a distance between the closed end of the second nose-cone 824 to the second end 826 (i.e., the length of the second nose-cone 824). In some embodiments, the first nose-cone 823 and the second nose-cone 824 may be arranged opposite to each other with a distance therebetween. In some embodiments, the length of the first nose-cone 823 and/or the length of the second nose-cone 824 may be larger than a length of a corresponding hole in a direction along the long axial of the acceleration cavity unit.

In some embodiments, a distance between the long axis of the coupling cavity unit and the plane 822 may be greater than a distance between the long axis of the coupling cavity unit and the outer wall of the each of the first nose-cone 823 and the second nose-cone 824. In this case, there may be a space between the each of the first nose-cone 823 and the second nose-cone 824 and the first plane. That is, the each of the first nose-cone 823 and the second nose-cone 824 may not contact the first plane so as to prevent a portion of the each of the first nose-cone 823 and the second nose-cone 824 from being cut off when performing the axially cutting of the body 820, and further prevent the coupling cavity 821 from communicating with atmosphere outside.

In a machining process for connecting the acceleration cavity unit and the coupling cavity unit 800, a portion of the coupling cavity unit 800 may be inserted into a groove of the acceleration cavity unit such that the first plane may be contacted with the second plane 822. A physical connection (e.g., a welded connection) between the acceleration cavity unit and the coupling cavity unit 800 may be established between the first plane and the plane 822. In order to allow the portion of the coupling cavity unit 800 to be inserted into the groove, a length of the coupling cavity unit 320 along the long axial of the coupling cavity unit may be smaller than a length of the first plane in the long axial of the acceleration cavity unit.

It should be noted that the above description of the coupling cavity unit 800 is merely provided for the purposes of illustration and not intended to limit the scope of the present disclosure. For persons having ordinary skill in the art, multiple variations and modifications may be made under the teachings of the present disclosure. However, those variations and modifications do not depart from the scope of the present disclosure. For example, the first nose-cone 823 and/or the second nose-cone 824 may have any other position and have any size and/or shape. As another example, the second plane 822 may not be parallel to the long axis of the coupling cavity unit 800. As a further example, the second plane 822 may be replaced by a curved surface.

Figure 9:
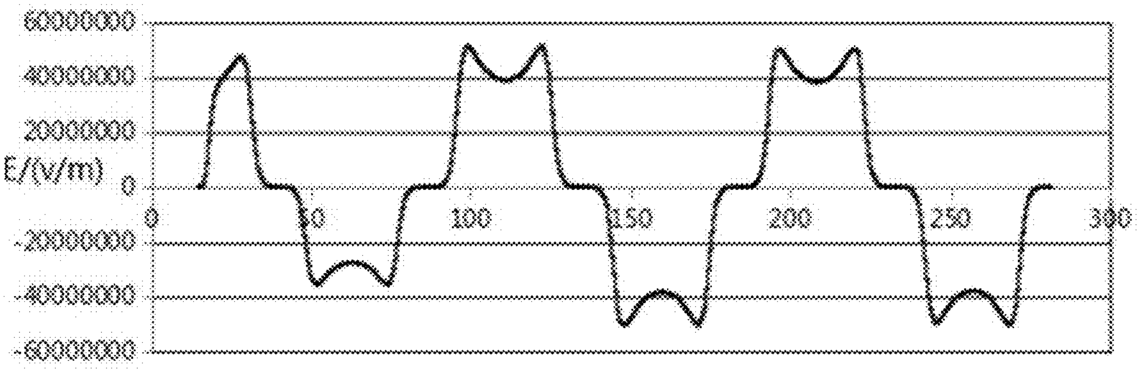
FIG. 9 is a schematic diagram illustrating an exemplary distribution of electric field strengths in an accelerating apparatus according to some embodiments of the present disclosure.

FIG. 9 is a schematic diagram illustrating an exemplary distribution of electric field strengths in an accelerating apparatus according to some embodiments of the present disclosure. As shown in FIG. 9, the horizontal axis represents a plurality of positions in the accelerating apparatus (e.g., the accelerating apparatus 300) along a long axis of the accelerating apparatus. And the vertical axis represents electric field strengths corresponding to the plurality of positions. As shown in FIG. 9, when one or more energy-conditioning components included in the accelerating apparatus are opened, electric field strengths corresponding to the plurality of positions may be distributed regularly.

Figure 10:
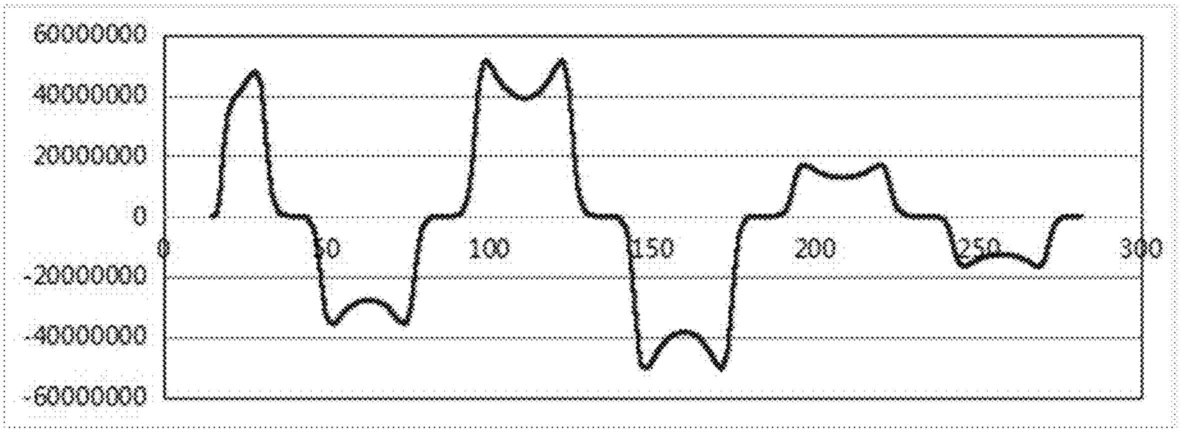
FIG. 10 is a schematic diagram illustrating an exemplary distribution of electric field strengths in an accelerating apparatus adjusted by one or more energy-conditioning components in the prior art.

FIG. 10 is a schematic diagram illustrating an exemplary distribution of electric field strengths in an accelerating apparatus adjusted by one or more energy-conditioning components in the prior art. As shown in FIG. 10, when the one or more energy-conditioning components according to the prior art is closed, electric field strengths of one or more acceleration cavities in the accelerating apparatus associated with the one or more the energy-conditioning components may decrease but may not decrease to zero.

Figure 11:
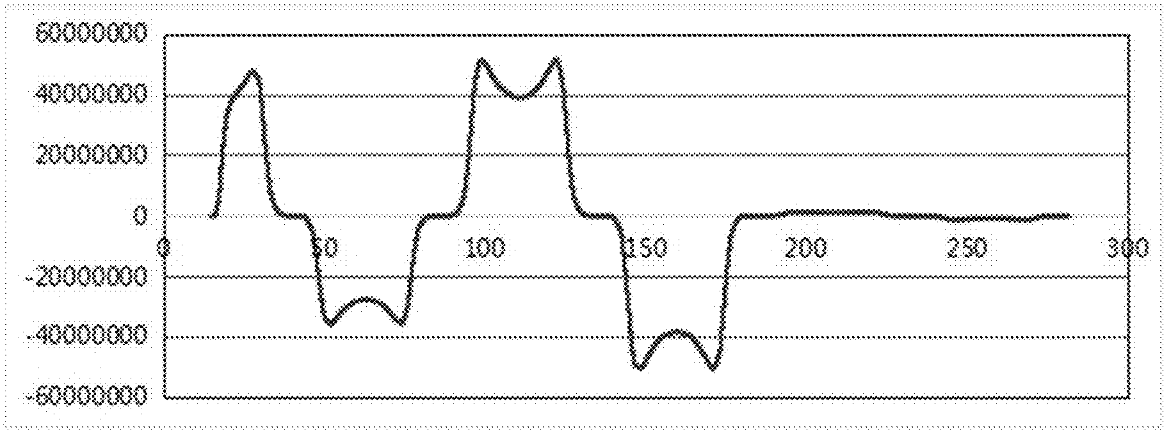
FIG. 11 is a schematic diagram illustrating an exemplary distribution of electric field strengths the accelerating apparatus adjusted by one or more energy-conditioning components according to some embodiments of the present disclosure.

FIG. 11 is a schematic diagram illustrating an exemplary distribution of electric field strengths the accelerating apparatus adjusted by one or more energy-conditioning components according to some embodiments of the present disclosure. As shown in FIG. 11, when adjusted by the one or more energy-conditioning components of the present disclosure (e.g., a hole of the accelerating apparatus is entirely covered by a resonant element), electric field strengths of one or more acceleration cavities associated with the one or more energy-conditioning components may be zero. That is, microwave power transmitted in the acceleration cavities associated with the energy-conditioning components may be shorted completely and/or a resonant frequency of the microwave power may be detuned completely. In this case, output energies of the accelerating apparatus may be reduced to the greatest extent.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. An accelerating apparatus, comprising:

a plurality of acceleration cavity units including a plurality of acceleration cavities; and a plurality of coupling cavity units, each of the plurality of coupling cavity units including a coupling cavity, two adjacent acceleration cavities being electromagnetically coupled via the coupling cavity, wherein the plurality of acceleration cavity units has a plurality of holes, each of the plurality of holes being configured to form a coupling channel between an acceleration cavity and a coupling cavity;

one or more energy-conditioning components, each energy-conditioning component of the one or more energy-conditioning components being configured to adjust an electric field strength of the acceleration cavity corresponding to the each energy-conditioning component, wherein at least one of the one or more energy-conditioning components includes a resonant element, the resonant element is moveable in the coupling cavity to open or close one of at least a portion of the plurality of holes, and a maximum moving distance of the resonant element is greater than or equal to a length of the one of at least a portion of the plurality of holes in a moving direction of the resonant element.

2. The accelerating apparatus of claim 1, wherein an edge region of each of at least a portion of the plurality of holes includes continuously varying curvatures.

3. The accelerating apparatus of claim 2, wherein the edge region of each of at least a portion of the plurality of holes is configured with a filleted corner such that the edge region of the each of at least a portion of the plurality of holes includes the continuously varying curvatures.

4. The accelerating apparatus of claim 2, wherein the edge region of each of at least a portion of the plurality of holes includes at least one of a first intersection region between an inner wall of the each of at least a portion of the plurality of holes and an inner wall of the acceleration cavity; or a second intersection region between the inner wall of the each of at least a portion of the plurality of holes and an outer wall of each of at least a portion of the plurality of acceleration cavity units.

5. The accelerating apparatus of claim 4, wherein the outer wall of each of at least a portion of the plurality of acceleration cavity units has a groove corresponding to the each of at least a portion of the plurality of holes; and one of the plurality of coupling cavity units is coupled with a surface of the groove.

6. The accelerating apparatus of claim 5, wherein the surface of the groove includes a first plane corresponding to the each of at least a portion of the plurality of holes, one end of the each of at least a portion of the plurality of holes being on the first plane, and the first plane being a mounting surface for a coupling cavity unit;

the one of the plurality of coupling cavity units includes a second plane, and the each of the plurality of acceleration cavity units is connected with one of the plurality of coupling cavity units by physically connecting the first plane with the second plane.

7. The accelerating apparatus of claim 6, wherein the resonant element is moveable between the first plane and the second plane in a direction parallel to the first plane to close or open the each of at least a portion of the plurality of holes.

8. The accelerating apparatus of claim 7, wherein an electric field strength of one of the plurality of acceleration cavities is tuned by adjusting a move distance of the resonant element corresponding to the one of the plurality of acceleration cavities along the direction parallel to the first plane.

9. The accelerating apparatus of claim 1, wherein the each of at least a portion of the plurality of holes is a waist-shaped hole or an oval hole.

10. The accelerating apparatus of claim 1, wherein an angle between a central axis of the each of at least a portion of the plurality of holes and a central axis of one of the plurality of acceleration cavity units that the each of at least a portion of the plurality of holes is located in a range from 30 degrees to 90 degrees.

11. The accelerating apparatus of claim 1, wherein the coupling cavity includes a first nose-cone and a second nose-cone, a distance between a long axis of the coupling cavity and the second plane being greater than a distance between the long axis of the coupling cavity and an outer wall of each of the first nose-cone and the second nose-cone.

12. The accelerating apparatus of claim 1, wherein at least one of the plurality of holes is located at a location of an inner surface of the acceleration cavity where electromagnetic field strength is maximum.

13. The accelerating apparatus of claim 1, wherein a long axis of each of the plurality of holes is perpendicular to a moving direction of a radiation beam in the acceleration cavity.

14. An accelerating apparatus, comprising:

a plurality of acceleration cavity units including a plurality of acceleration cavities; and a plurality of coupling cavity units, each of the plurality of coupling cavity units including a coupling cavity, two adjacent acceleration cavities being electromagnetically coupled via the coupling cavity, wherein the plurality of acceleration cavity units has a plurality of holes, each of the plurality of holes being configured to form a coupling channel between an acceleration cavity and a coupling cavity;

one or more energy-conditioning components, each energy-conditioning component of the one or more energy-conditioning components being configured to adjust an electric field strength of the acceleration cavity corresponding to the each energy-conditioning component, wherein at least one of the one or more energy-conditioning components includes a resonant element and the resonant element is moveable in the coupling cavity to open or close one of at least a portion of the plurality of holes, when each of at least a portion of the plurality of holes is at least partially covered by the resonant element to at least partially close the each of at least a portion of the plurality of holes, and an electric field strength of the acceleration cavity corresponding to the each of at least a portion of the plurality of holes is less than a threshold.

15. The accelerating apparatus of claim 14, wherein the threshold is less than 20%, 15%, 10%, 5%, 4%, 3%, 2%, 1%, 0.5%, 0.1%, or 0.01% of the maximum electric field strength when each of at least a portion of the plurality of holes is open completely.

16. The accelerating apparatus of claim 14, wherein each of the plurality of acceleration cavity units has a first plane, one end of one of the plurality of holes being on the first plane, and the first plane being a mounting surface for a coupling cavity unit;

each of the plurality of coupling cavity units has a second plane, and the each of the plurality of acceleration cavity units is connected with one of the plurality of coupling cavity units by physically connecting the first plane with the second plane.

17. The accelerating apparatus of claim 16, wherein the resonant element is moveable between the first plane and the second plane in a direction parallel to the first plane to close or open the each of at least a portion of the plurality of holes.

18. The accelerating apparatus of claim 14, wherein when the each of at least a portion of the plurality of holes is entirely covered by the resonant element to close the each of at least a portion of the plurality of holes, an electric field strength of the acceleration cavity corresponding to the each of at least a portion of the plurality of holes is zero or approximately zero.

19. An accelerating apparatus, comprising:

a plurality of acceleration cavity units including a plurality of acceleration cavities; and a plurality of coupling cavity units, each of the plurality of coupling cavity units including a coupling cavity, two adjacent acceleration cavities being electromagnetically coupled via the coupling cavity, wherein the plurality of acceleration cavity units has a plurality of holes, each of the plurality of holes being configured to form a coupling channel between an acceleration cavity and a coupling cavity;

at least one of the plurality of holes is located at a location of an inner surface of the acceleration cavity where an electromagnetic field strength satisfies a condition, the condition including a ratio of the electromagnetic field strength to the maximum electromagnetic field strength at the inner surface of the acceleration cavity exceeds a threshold.

20. The accelerating apparatus of claim 19, wherein the threshold is 70%, 75%, 80%, 85%, 90%, 95%, 96%, 97%, 98%, or 99%.

* * * * *